United States Patent
Kim et al.

(10) Patent No.: US 9,912,791 B2
(45) Date of Patent: Mar. 6, 2018

(54) WATCH TYPE TERMINAL AND METHOD OF CONTROLLING THE SAME

(71) Applicant: LG ELECTRONICS INC., Seoul (KR)

(72) Inventors: Taeyong Kim, Seoul (KR); Daeho Moon, Seoul (KR); Sangjoo Park, Seoul (KR); Jay Han, Seoul (KR)

(73) Assignee: LG Electronics Inc., Seoul (KR)

(*) Notice: Subject to any disclaimer, the term of this patent is extended or adjusted under 35 U.S.C. 154(b) by 190 days.

(21) Appl. No.: 14/884,919

(22) Filed: Oct. 16, 2015

(65) Prior Publication Data
US 2016/0205234 A1    Jul. 14, 2016

(30) Foreign Application Priority Data

Jan. 14, 2015  (KR) .................. 10-2015-0006876

(51) Int. Cl.
| | | |
|---|---|---|
| *H04M 1/21* | (2006.01) | |
| *H04M 1/725* | (2006.01) | |
| *H04W 4/00* | (2009.01) | |
| *H04W 76/02* | (2009.01) | |

(52) U.S. Cl.
CPC .......... *H04M 1/21* (2013.01); *H04M 1/7253* (2013.01); *H04M 1/72519* (2013.01); *H04M 1/72563* (2013.01); *H04M 1/72583* (2013.01); *H04M 2250/02* (2013.01); *H04M 2250/04* (2013.01); *H04M 2250/06* (2013.01); *H04W 4/006* (2013.01); *H04W 76/025* (2013.01)

(58) Field of Classification Search
CPC ... H04W 4/008; H04W 76/025; H04W 4/006; H04M 1/21; H04M 1/72519; H04M 1/72563; H04M 1/7253; H04M 1/72583; H04M 2250/02; H04M 2250/04; H04M 2250/06
See application file for complete search history.

(56) References Cited

U.S. PATENT DOCUMENTS

| | | | |
|---|---|---|---|
| 2006/0246903 A1 | 11/2006 | Kong et al. | |
| 2015/0011199 A1 | 1/2015 | Lee et al. | |
| 2015/0222744 A1* | 8/2015 | Azim ................. | H04M 3/2218 379/140 |
| 2016/0095017 A1* | 3/2016 | Ely ...................... | H04W 4/027 455/454 |
| 2016/0100303 A1* | 4/2016 | Kim .................... | H04W 76/02 455/426.1 |

FOREIGN PATENT DOCUMENTS

CN    103634460 A    3/2014

* cited by examiner

*Primary Examiner* — Olumide T Ajibade Akonai
*Assistant Examiner* — Margaret G Mastrodonato
(74) *Attorney, Agent, or Firm* — Dentons US LLP

(57) ABSTRACT

A watch type terminal includes: a first communication unit configured to perform communication with an external server; a second communication unit configured to perform communication with an external device; and a control unit configured to provide control to perform communication with the external server through a communication unit of the external device when the watch type terminal interworks with the external device through the second communication unit, and to deactivate the first communication unit.

14 Claims, 20 Drawing Sheets

WATCH TYPE TERMINAL AND METHOD OF CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2015-0006876, filed on Jan. 14, 2015, the contents of which is incorporated by reference herein in its entirety.

BACKGROUND OF THE INVENTION

1. Field of the Invention

The present disclosure relates to a watch type terminal interworking with a mobile terminal and a method of controlling the same.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display.

Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Meanwhile, recently, mobile terminal that can be worn on human bodies (wearable devices) have been developed. As part of wearable devices, a watch type terminal that can be worn on a wrist has been developed.

Due to the characteristics of a watch type terminal which is worn on a user's wrist, a size of a main body thereof is so small that battery capacity is reduced. Thus, in order to solve the battery capacity problem of a watch type terminal, a necessity to develop a control method of reducing battery consumption of a watch type terminal has emerged.

SUMMARY OF THE INVENTION

Therefore, an aspect of the detailed description is to provide a method of reducing battery consumption of a watch type terminal.

Another aspect of the detailed description is to provide a method of performing communication of a watch type terminal by using an external device.

To achieve these and other advantages and in accordance with the purpose of this specification, as embodied and broadly described herein, a watch type terminal may include: a first communication unit configured to perform communication with an external server; a second communication unit configured to perform communication with an external device; and a control unit configured to provide control to perform communication with the external server through a communication unit of the external device when the watch type terminal interworks with the external device through the second communication unit, and to deactivate the first communication unit.

In an exemplary embodiment of the present disclosure, when an external device satisfying a preset condition is sensed, the control unit provides control to interwork with the external device.

In an exemplary embodiment of the present disclosure, the control unit may transmit identification information of the watch type terminal to the external device to use the communication unit of the external device, detect information received by the watch type terminal on the basis of the identification information of the watch type terminal, and receive the detected information from the external device through the second communication unit.

In an exemplary embodiment of the present disclosure, the control unit may determine whether to activate the second communication unit on the basis of usage information related to the use of the external device.

In an exemplary embodiment of the present disclosure, in a state in which the second communication unit is deactivated on the basis of the usage information related to the use of the external device, the control unit may activate the second communication unit on the basis of a user request.

In an exemplary embodiment of the present disclosure, when the second communication unit is activated, the control unit may interwork again with the external device.

In an exemplary embodiment of the present disclosure, the watch type terminal may further include a display unit configured to display a plurality of information items, wherein the control unit may determine a duration of a control command for executing a function related to the plurality of information items on the basis of a consumption data amount estimated to execute a function related to the plurality of information items.

In an exemplary embodiment of the present disclosure, when the estimated consumption data amount is a first data amount, the control unit may execute a function related to the plurality of information items in response to a short touch, and when the estimated consumption data amount is a second data amount greater than the first data amount, the control unit may execute a function related to the plurality of information items in response to a long touch.

In an exemplary embodiment of the present disclosure, the control unit may display the plurality of information items such that they are visually distinguished on the basis of consumption data amounts estimated for executing functions related to the plurality of information items.

In an exemplary embodiment of the present disclosure, in a state in which the first communication unit is deactivated, when it is sensed that the watch type terminal does not interwork with the external device, the control unit may activate the first communication unit.

In an exemplary embodiment of the present disclosure, the watch type terminal may further include: a display unit configured to display log information indicating a plurality of call signals, wherein the control unit may control the display unit to display log information related to a call signal received by the external device to be visually distinguished from log information related to a call signal received by the watch type terminal.

In an exemplary embodiment of the present disclosure, in response to a touch applied to information related to a call signal received by the external device, the control unit may determine in which of the watch type terminal and the external device the function related to the call signal is to be executed.

In an exemplary embodiment of the present disclosure, when the watch type terminal and the external device do not interwork with each other, the control unit may control the external device to output notification information indicating that a function related to the call signal needs to be performed in the external device.

In an exemplary embodiment of the present disclosure, when the watch type terminal interworks with the external device, the control unit may receive identification information of the external device through the second communication unit, and control the first communication unit such that the external device performs communication by using the first communication unit, in place of the communication unit of the external device.

In an exemplary embodiment of the present disclosure, the watch type terminal may further include: a display unit, wherein when the watch type terminal interworks with the external device, the control unit may output a pop-up window allowing a user to select whether to perform communication through the external device, on the display unit.

To achieve these and other advantages and in accordance with the purpose of this specification, as embodied and broadly described herein, a method of controlling a watch type terminal may include: sensing an external device within a preset distance; and when an external device within the preset distance is sensed, interworking with the external device; and when interworking with the external device, performing communication through the external device.

In an exemplary embodiment of the present disclosure, when communication is performed through the external device, a communication unit provided in the watch type terminal may be deactivated.

In an exemplary embodiment of the present disclosure, in the performing of communication through the external device, identification information of the watch type terminal may be transmitted to the external device such that communication may be performed by the external device.

In an exemplary embodiment of the present disclosure, when a preset condition is met while communication is being performed through the external device, interworking with the external device may be released.

In an exemplary embodiment of the present disclosure, in a state in which interworking with the external device is released, the watch type terminal may interwork with the external device again according to a user request.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1A:
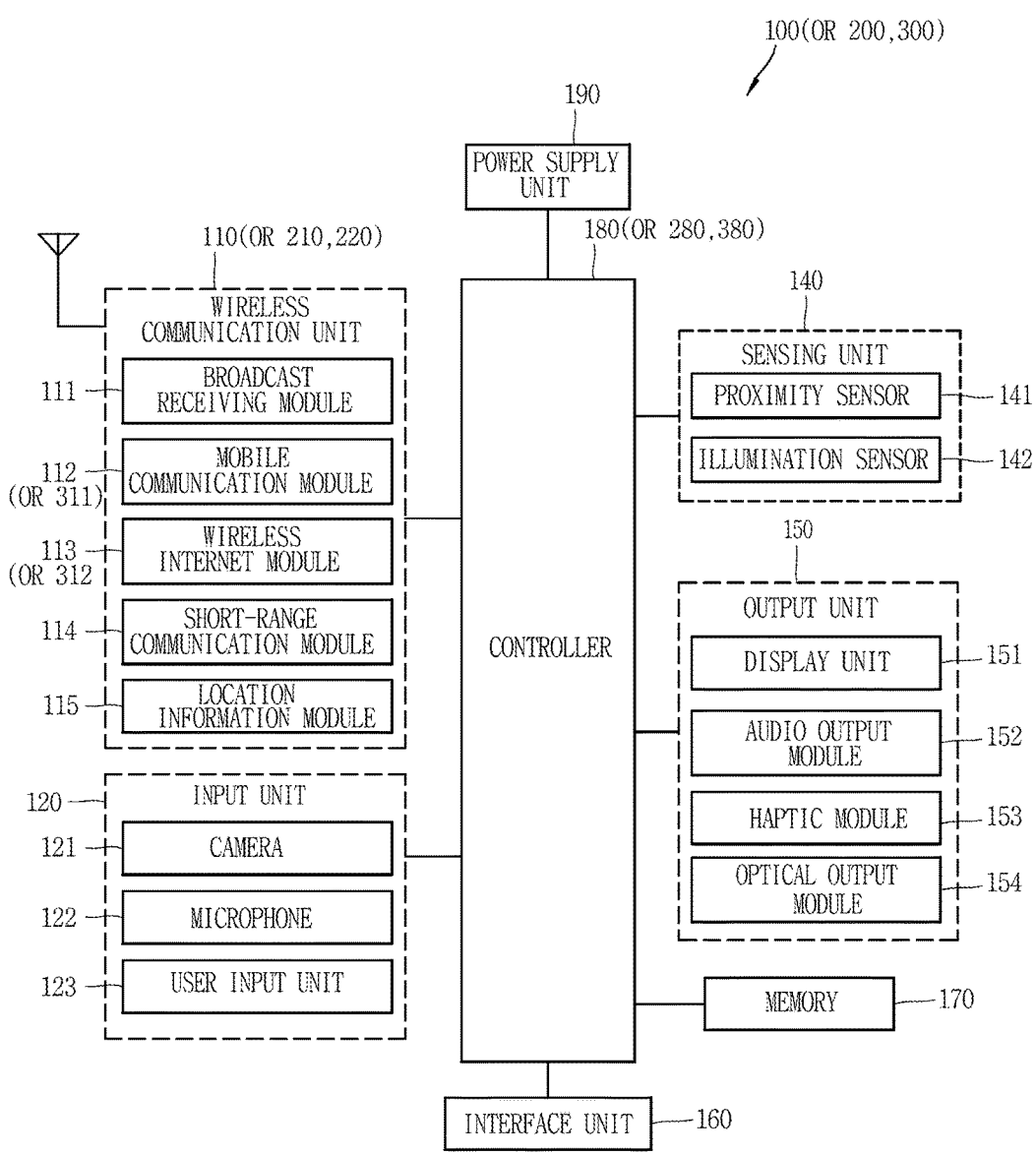
FIG. 1A is a block diagram of a mobile terminal according to an exemplary embodiment of the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
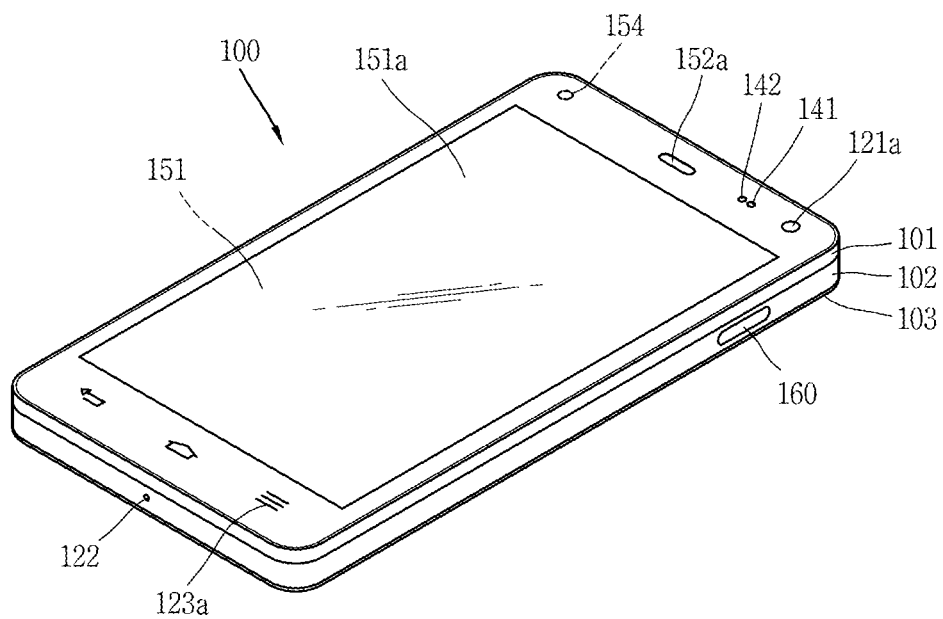
FIGS. 1B and 1C are conceptual views of one example of a mobile terminal, viewed from different directions.
Figure 1C:
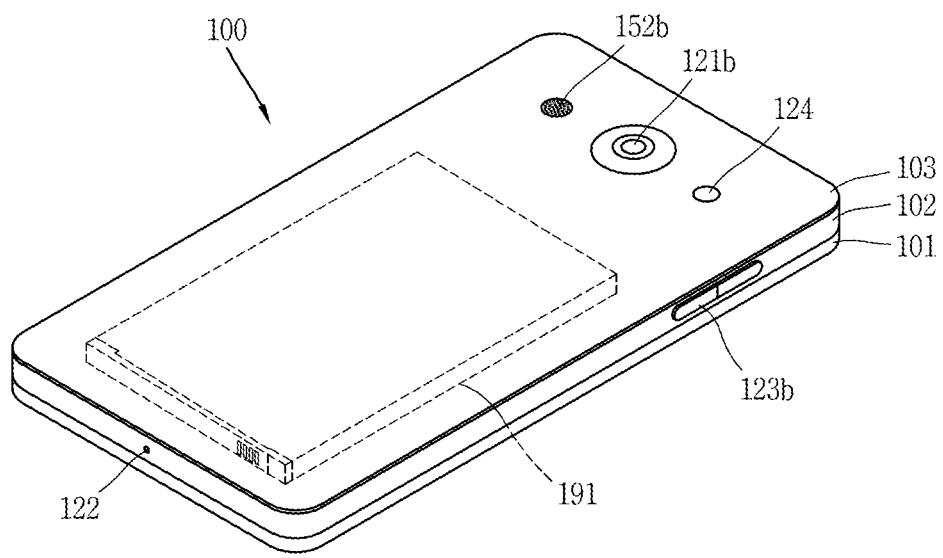

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a control unit 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which region of the display unit 151 has been touched. Here, the touch controller may be a component separate from the control unit 180, the control unit 180, and combinations thereof.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output units 152a and 152b, a proximity sensor 141, an illumination sensor 142, an optical output unit 154, first and second cameras 121a and 121b, first and second manipulation units 123a and 123b, a microphone 122, and an interface unit 160.

Hereinafter, the mobile terminal 100 in which the display unit 151, the first audio output unit 152a, the proximity sensor 141, the illumination sensor 142, the optical output unit 154, the first camera 121a, and the first manipulation unit 123a are disposed on the front surface of the terminal body, and the second manipulation unit 123b, the microphone 122, and the interface unit 160 are disposed on the side of the terminal body, and the second audio output unit 152b and the second camera 121b are disposed on the rear surface of the terminal body will be described, for example, as illustrated in FIGS. 1B and 1C.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 displays (outputs) information processed in the mobile terminal 100. For example, the display unit 151 may display execution screen information of an application program driven in the mobile terminal 100, or a user interface (UI) or graphic user interface (GUI) information according to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring a call sound to the user's ear, and the second audio output unit 152b may be implemented in the form of a loud speaker to output various alarm sounds or multimedia audio reproduction.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject.

As shown in FIG. 1B, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like. Hereinafter, examples of a mobile terminal extending to a wearable device will be described.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 1D:
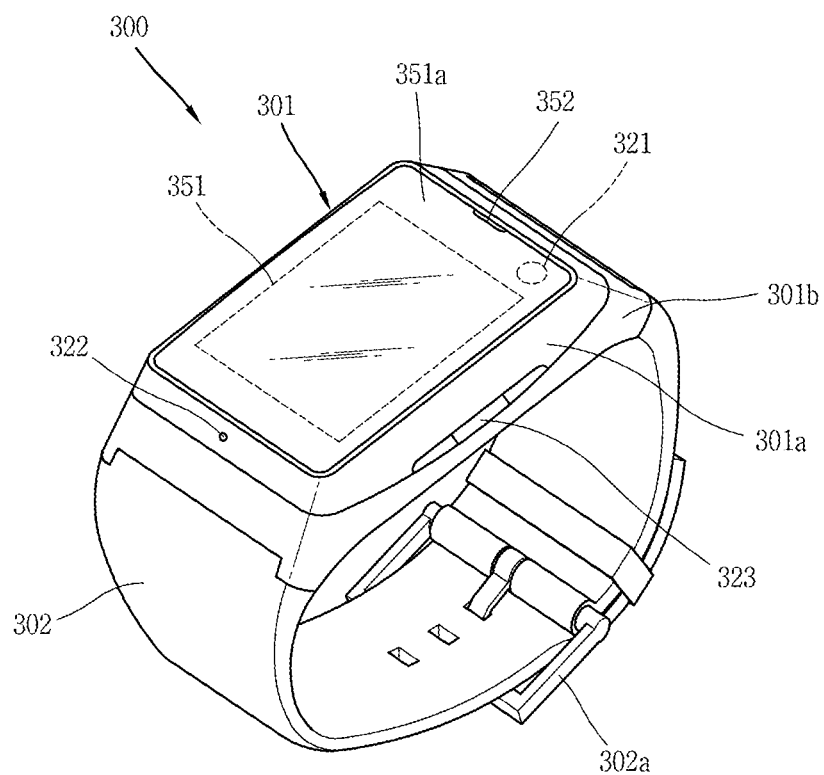
FIG. 1D is a conceptual view illustrating an example of a watch type terminal according to an exemplary embodiment of the present disclosure.

FIG. 1D is a perspective view illustrating one example of a watch-type mobile terminal 300 in accordance with another exemplary embodiment.

As illustrated in FIG. 1D, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301*a* and a second case 301*b* cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351*a* is positioned on the first case 301*a* to form a front surface of the terminal body together with the first case 301*a*.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302*a*. The fastener 302*a* may be implemented into a buckle type, a snap-fit hook structure, a Velcro® type, or the like, and include a flexible section or material. The drawing illustrates an example that the fastener 302*a* is implemented using a buckle.

Hereinafter, a communication system operable through the mobile terminal 100 according to an embodiment of the present invention will be described.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system.

A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)—based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Hereinafter, exemplary embodiments related to a control method that may be realized in the mobile terminal configured described above will be described with reference to the accompanying drawings. It will be obvious by a person skilled in the art that the present invention is embodied to any other forms without departing from the sprit and scope of the present invention. Also, in the following descriptions, drawings are described in order of clockwise direction, starting from the drawing in an upper portion on the left.

A watch type terminal according to an exemplary embodiment of the present disclosure is a wearable device that can be worn on at least part of a human body. The wearable device may need to be compact and lightweight in terms of characteristics that it is worn on a human body.

Meanwhile, due to compactness of the watch type terminal, battery capacity may be reduced to limit a usage time of the watch type terminal. Hereinafter, in order to solve the foregoing problem, a method of effectively using a battery of a watch type terminal will be described.

Figure 2:
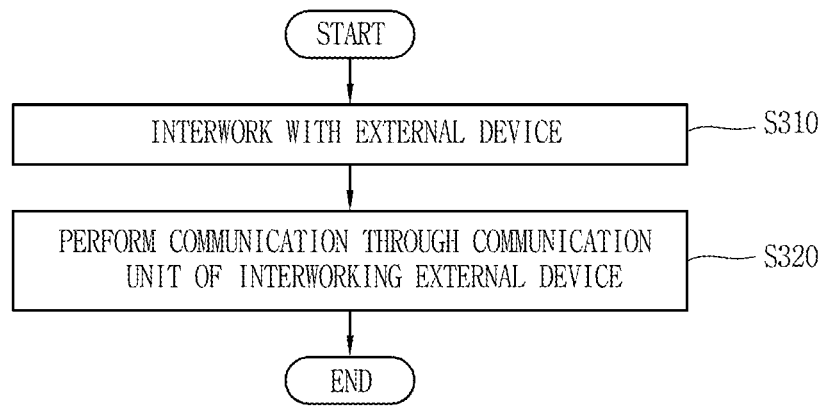
FIG. 2 is a flow chart illustrating a way in which a watch type terminal performs communication according to an exemplary embodiment of the present disclosure.
Figure 3:
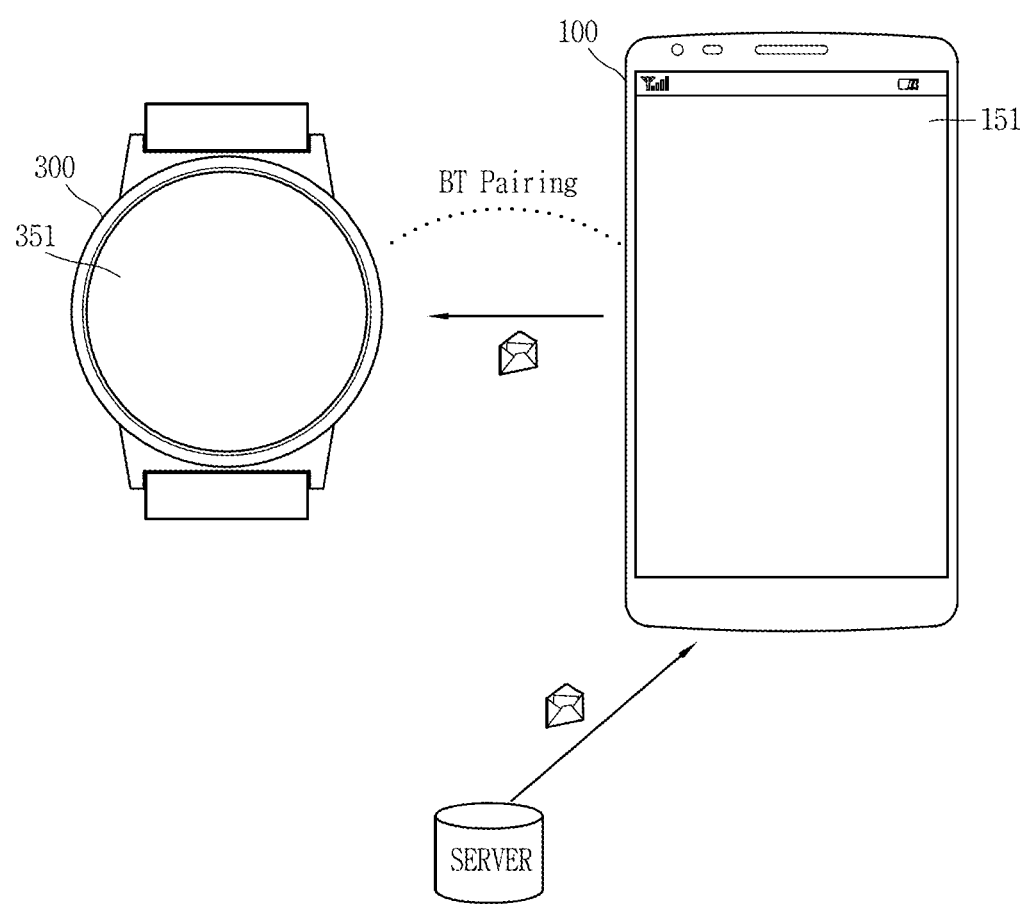
FIG. 3 is a conceptual view illustrating a control method of FIG. 2.

FIG. 2 is a flow chart illustrating a way in which a watch type terminal performs communication according to an exemplary embodiment of the present disclosure, and FIG. 3 is a conceptual view illustrating a control method of FIG. 2.

A watch type terminal 300 according to an exemplary embodiment of the present disclosure may perform a step of interworking with an external device through communication (S310). Here, the external device refers to a base station or a device which communicates with the watch type terminal through a network such as a base station. For example, the external device may be a cellular phone, a tablet, a notebook computer, various wearable devices, and the like.

The watch type terminal 300 according to an exemplary embodiment of the present disclosure may include a first communication 310 performing remote communication (or telecommunication), a second communication unit 320 performing near-field communication, and a display unit 351.

The first communication unit 310 may include a mobile communication unit 311, and a wireless Internet unit 312. The mobile communication unit 311 transmits and receives a wireless signal to and from at least one among a base station, an external terminal, and a server in a mobile communication network established according to technical standards or communication schemes for mobile communication (e.g., GSM (Global System for Mobile communication), CDMA (Code Division Multi Access), CDMA2000 (Code Division Multi Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), LTE (Long Term Evolution), LTE-A (Long Term Evolution-Advanced).

The wireless signal may include a voice call signal, a video call signal, or various types of data according to a text/multimedia message transmission.

The wireless Internet unit 312, which refers to a module for a wireless Internet access, may be installed in the watch type terminal 300 or installed outside of the watch type terminal 300. The wireless Internet unit 312 is configured to transmit and receive a wireless signal in a communication network according to wireless Internet techniques.

The wireless Internet techniques may include, for example, WLAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), LTE-A (Long Term Evolution-Advanced), and the like, and the wireless Internet unit 312 transmits and receives data according to at least one wireless Internet technique within a range including an Internet technique not enumerated in the above Considering that a wireless Internet access based on WiBro, HSDPA, HSUPA, GSM, CDMA, WCDMA, LTE, LTE-A, and the like, is performed through a mobile communication network, the wireless Internet unit 312 may be understood as a type of the mobile communication unit 311

That is, the first communication unit 310 may refer to a communication unit that performs communication through a network.

The second communication unit 320 may be directly connected to an external device 200 positioned within a preset distance to perform communication. That is, the second communication unit 320 may perform communication with the external device 200 outside a preset range from the watch type terminal. That is, the second communication 320 may not perform communication with the external device 200 outside a preset range from the watch type terminal.

Interworking with the external device 200 may refer to a state in which the watch type terminal is connected to the external device through communication by the second communication unit 314. In detail, interworking may be a state in which the watch type terminal 300 and the external device directly perform communication with each other without a relay (for example, a server).

The second communication unit 314 may support short range communication using at least one among (Bluetooth™), RFID (Radio Frequency Identification), Infrared Data Association (IrDA), UWB (Ultra Wideband), Zig-Bee™' NFC (Near Field Communication), Wi-Fi (Wireless-Fidelity), Wi-Fi Direct, and Wireless USB (Wireless Universal Serial Bus).

For example, the watch type terminal 300 may interwork with the external device using the Bluetooth™ technique. In this case, the watch type terminal 300 may directly perform communication with the external device.

In a case in which the watch type terminal 300 interworks with the external device through the second communication unit, the watch type terminal 300 may perform a step (S320) of performing communication with an external server through the external device interworking therewith.

The watch type terminal 300 may be a device including a communication unit capable of performing communication with an external server such as an electronic device for a vehicle, a tablet, and the like. Hereinafter, a case in which the external device is the mobile terminal 100 is assumed and described, but the present disclosure may also be applied to various external devices including a communication unit in the same manner.

The external device 200 may include a first communication unit 210 performing communication with an external server, a second communication unit 220 performing communication for interworking with the watch type terminal 300, and a control unit 280.

When the external device is positioned within a preset distance, the control unit 380 of the watch type terminal 300 may transmit an interworking signal to the external device through the second communication unit 320 to interwork with the external device. Thereafter, the control unit 380 may interwork with the external device through the second communication unit 320.

Here, the control unit 380 may transmit the interworking signal on the basis of a user request. That is, on the basis of a user request, the control unit 380 may transmit an interworking signal to the external device positioned within the preset distance and perform interworking with the external device.

When interworking with the external device, the control unit 380 may control the external device to perform communication through a first communication unit of the external device.

Meanwhile, the watch type terminal 300 may further include an identifying unit as a chip storing various types of information for authenticating authority to use the mobile terminal 100. Identification information may be stored in the identifying unit.

Here, in order for the external device 200 interworking with the watch type terminal 300 to perform communication in place of the first communication unit 310 of the watch type terminal 300, the external device 200 requires identification information of the watch type terminal 300.

Thus, in order to perform communication using the external device, the control unit 380 may transmit identification information stored in the identifying unit. The identification information may be information included in a subscriber identity module (SIM). The SIM may be a module in the form of a card storing information related to various services used in the mobile terminal. Also, the information included in the SIM may include various types of information such as subscriber authentication information, billing information, security information, and the like.

When the identification information is received from the watch type terminal 300, the external device may store the identification information. Thereafter, on the basis of the identification information, the external device may perform communication in place of the first communication unit 310 of the watch type terminal 300.

Here, whether to perform communication through the external device 200 interworking with the watch type terminal 300 may be set by the user or may be automatically performed when preset conditions are met.

The control unit 380 may receive a wireless signal from an external server through the first communication unit 210 of the external device 200. For example, the wireless signal may be a signal indicating wirelessly transmitted information such as call information, message information, Internet information, and the like.

The external server, a pre-set external server, may be a server able to perform communication with the first communication unit. For example, the external server may be a server related to a call service, a messenger service, and an Internet server. The external server may be a server related to an operation of a mobile communication network. The external server may reefer to a base station (nodeB, or enhanced Node B) of a mobile communication network such as WiBro, HSDPA, HSUPA, GSM, CDMA, WCDMA, LTE, LTE-A, and the like.

In the following descriptions, a messenger service will be described as an example for the purposes of description, but the present disclosure is not limited thereto.

Also, when communication is performed through the first communication unit 210 of the external device, the control unit 380 may not perform communication through the first communication 310 provided in the watch type terminal 300.

That is, the control unit 380 may deactivate the first communication unit 310 provided in the watch type terminal 300. Deactivating the first communication unit 310 may refer to a state in which an operation current is not supplied to the first communication unit 310 so that communication is not performed through the first communication unit 310. Conversely, activating the first communication unit 310 may refer to a state in which an operation current is supplied to the first communication unit so that communication may be performed through the first communication unit 310.

Meanwhile, the first communication unit performs communication performs communication through a network, and thus, battery consumption may be greater than that when communication is performed through the second communication unit. Thus, in the watch type terminal 300 according to an exemplary embodiment of the present disclosure, when communication is performed through the first communication unit 210 of the external device, battery consumption may be reduced.

In detail, as illustrated in FIG. 3, the watch type terminal 300 according to an exemplary embodiment of the present disclosure may interwork with an external device adjacent to the watch type terminal 300. For example, the external device may be the mobile terminal 100.

When the watch type terminal 300 interworks, the control unit 380 may perform communication with an external server through the first communication unit 210 of the external device 200 which interworks with the watch type terminal 300. Also, the control unit 380 may deactivate the first communication unit 310 provided in the watch type terminal 300 such that communication may not be performed through the first communication unit 310.

The control unit 380 may receive a message from the external server through the first communication unit 210 of the external device that interworks. In detail, the message may be transmitted from the server to the external device 200, and the external device 200 may transmit the message to the watch type terminal 300 through the second communication unit 320.

That is, the watch type terminal 300 may receive the message through the interworking external device, without directly communicating with the server.

Here, the display unit 351 of the watch type terminal 300 may be deactivated together when the first communication unit 310 is deactivated. Also, when the first communication unit 310 is deactivated, the display unit 351 of the watch type terminal 300 may output clock information on at least a portion of the display unit 351 on the basis the deactivation of the first communication unit 310.

Deactivation of the display unit 351 may be a state in which lighting of the display unit 351 is turned on so it is possible to display screen information. Deactivation of the display unit 351 may be a state in which lighting of the display unit 351 is turned off so it is not possible to display screen information.

That is, when communication is performed through the external device 200, the watch type terminal 300 according to an exemplary embodiment of the present disclosure may provide a clock function as a basic function of the watch type terminal 300, while limiting current consumption due to communication.

In addition, the control unit 380 may release interworking with the external device on the basis of a preset condition in a state of interworking with the external device 200. In this case, the external device 200 may continue to perform communication continuously or discontinuously on the basis of the identification information of the watch type terminal 300. That is, the external device 200 may continue to perform communication continuously or discontinuously even in a state in which interworking with the watch type terminal 300 is released, in place of the watch type terminal 300.

The preset condition may be conditions related to a usage state of the external device 200 in a state in which the external device 200 interworks with the watch type terminal 300.

For example, the preset condition may be a condition in which the external device 200 is sensed to be used while interworking with the watch type terminal 300. For example, the preset condition may be a condition in which it is sensed that a display of the external device 200 is in an ON state. For example, the preset condition may be a condition in which it is sensed that the external device 200 is unlocked. For example, the preset condition may be a condition in which it is sensed that a user input is continuously applied to the external device 200. For example, the preset condition may be a condition in which the user's face or eyes are sensed by a camera of the external device 200. For example, the preset condition may be a condition in which physical information (e.g., electrocardiogram, pulse, and the like) of the user obtained from the external device 200 and physical information of the user obtained from the watch type terminal 300 are compared to determine whether the users are identical. For example, the preset condition may be a condition in which the external device 200 and the watch type terminal 300 are in a state of being available for human body communication through the user's body.

The preset condition may be sensed by the watch type terminal 300, but the present disclosure is not limited thereto. The preset condition or a parameter associated with the condition may be transmitted from the external device 200 to the watch type terminal 300 or may be transmitted from the watch type terminal 300 to the external device 200. Also, in a case in which the external device 200 determines that the preset condition is met, particular information or a particular command may be transmitted to the watch type terminal 300.

Also, when interworking with the external device 200 is released, the control unit 380 may deactivate the second communication unit 320. That is, the control unit 380 may stop supplying an operation current to the second communication unit 320.

Since supplying of an operation current flowing to the second communication unit 320 is stopped, battery consumption used in the first and second communication units 310 and 320 of the watch type terminal 300 may be reduced in an exemplary embodiment of the present disclosure.

Meanwhile, in a state in which the current supply to the first and second communication units 310 and 320 of the watch type terminal 300 is stopped, when the preset condition is met, the control unit 380 may activate at least one of the first and second communication units 310 and 320. The preset condition may be a condition in which a preset period of time has lapsed in a state in which the first and second communication units 310 and 320 are deactivated, a condition in which a control command for activating at least one of the first and second communication units 310 and 320 is received from the user, and the like.

For example, the preset condition may be a condition in which it is sensed that the external device 200 is not in use in a state in which the external device 200 interworks with the watch type terminal 300. For example, the preset condition may be a condition in which it is sensed that the display of the external device 200 is turned off. For example, the preset condition may be a condition in which the external device 200 is locked. For example, the preset condition may be a condition in which it is sensed that a user input is not applied to the external device 200 for a preset period of time. For example, the preset condition may be a condition in which the user's face or eyes are not sensed by the camera of the external device 200. For example, the preset condition may be a condition in which it is not possible to obtain one or more of physical information (e.g., electrocardiogram pulse, and the like) of a first user obtained from the external device 200 and physical information of a second user obtained from the watch type terminal 300 or a condition in which the physical information of the first user and the physical information of the second user are compared and it is determined that the first user and the second user are not the same user. For example, the preset condition may be a condition in which it is sensed that the external device 200 and the watch type terminal 300 are in a state of not being available for human body communication through the user's body.

The preset condition may be sensed by the watch type terminal 300 but the present invention is not limited thereto. The preset condition or a parameter associated with the condition may be transmitted from the external device 200 to the watch type terminal 300 or may be transmitted from the watch type terminal 300 to the external device 200. Also, in a case in which the external device 200 determines that the preset condition is met, particular information or a particular command may be transmitted to the watch type terminal 300.

When the first communication unit 310, among the first and second communication units 310 and 320, is activated, the control unit 380 may stop the external device 200 from performing communication, on the basis of the identification information of the watch type terminal 300.

In detail, the control unit 380 may transmit a stop request message for stopping performing of communication to the external device 200 by using the identification information of the watch type terminal 300. When the stop request message is received, the external device 200 may stop performing communication by using the identification information of the watch type terminal 300.

Also, the control unit 380 may receive, through the first communication unit 310, information which has been received by the external device 200 from a point in time at which interworking with the external device 200 was stopped to a point in time at which the first communication unit 380 was activated again.

Also, in a case in which the second communication unit 320, among the first and second communication units 310 and 320, is activated, the control unit 380 may control the second communication unit 320 to interwork with the external device again.

Here, when watch type terminal 300 interworks with the external device 200 through the second communication unit 320, the control unit 380 may transmit information, which has been received through communication performed on the basis of the identification information of the watch type terminal 300 during the period in which interworking was released, to the watch type terminal 300. Accordingly, in an exemplary embodiment of the present disclosure, when interworking is resumed after it was released, information, which has been received during the period in which the interworking was released, may be received.

Also, the control unit 380 may activate both the first and second communication units 310 and 320. In this case, the control unit 380 may stop the external device 200 from performing communication using identification information of the watch type terminal 300.

Also, the control unit 380 may receive, through the first communication unit 310, information which has been received by the external device 200 from a point in time at which interworking with the external device 200 was stopped to a point in time at which the first communication unit 380 was activated again.

Meanwhile, when the interworking with the external device is released according to a user request, the control unit 380 may stop the external device 200 from performing communication on the basis of the identification information of the watch type terminal 300. The user request may be a request for releasing interworking with the external device 200 or may be a request for activating the first communication unit 310.

That is, unlike the case in which interworking with the external device 200 is released according to a preset condition, when interworking with the external device 200 is released by the user, the communication using the external device may be stopped.

Here, the control unit 380 may activate the first communication unit 310 again. That is, the control unit 380 may perform communication again through the first communication unit 310.

Meanwhile, when interworking with the watch type terminal 300 is released and a communication stop request message is received from the watch type terminal 300, the external device 200 may not perform communication through the identification information any longer.

In the above, the method in which the watch type terminal performs communication using the external device which interworks with the watch type terminal has been described. In this manner, in an exemplary embodiment of the present disclosure, battery consumption due to performing of communication through a network may be reduced. Also, in an exemplary embodiment of the present disclosure, since battery consumption is reduced, the watch type terminal may be more effectively used.

Hereinafter, a method in which a watch type terminal interworks with an external device will be described.

FIGS. 4A, 4B, 4C, and 4D are conceptual views illustrating a way in which a watch type terminal interworks with an external device.

The watch type terminal 300 according to an exemplary embodiment of the present disclosure may sense through the second communication unit 320 that an external device (for example, the mobile terminal 100) is present at a preset distance or within a propagation range. Here, the external device present at the preset distance or within the propagation range may be an external device that may be able to interwork. Here, when the external device is present at the preset distance or within the propagation range, the control unit 380 of the watch type terminal 300 may interwork with the external device through the second communication unit 320. That is, when the external device is present at the preset distance or within the propagation range so the external device is available for interworking, the control unit 380 of the watch type terminal 300 may interwork with the external device through the second communication unit 320.

A preset condition, whether the external device is present at the preset distance or within the propagation range may be determined through estimation or may be determined based on a calculated distance, but the present disclosure is not limited thereto and whether the external device is present at the preset distance or within the propagation range may be determined may be determined using a substitute parameter associated with the distance. As the substitute parameter, for example, a parameter (for example, signal power, noise power, RSRP (Reference signal received power), RSRQ (Reference signal received quality), RSSI (Received signal strength indicator), SINR (Signal to interference plus noise ratio), etc.) calculated from a signal received from the external device may be used for the same purpose even without estimation or calculation of an actual distance or propagation range. In the present disclosure, the preset distance or propagation range may be used in any case in which the substitute parameter is used without estimation or calculation of an actual distance or propagation range.

Figure 4A:
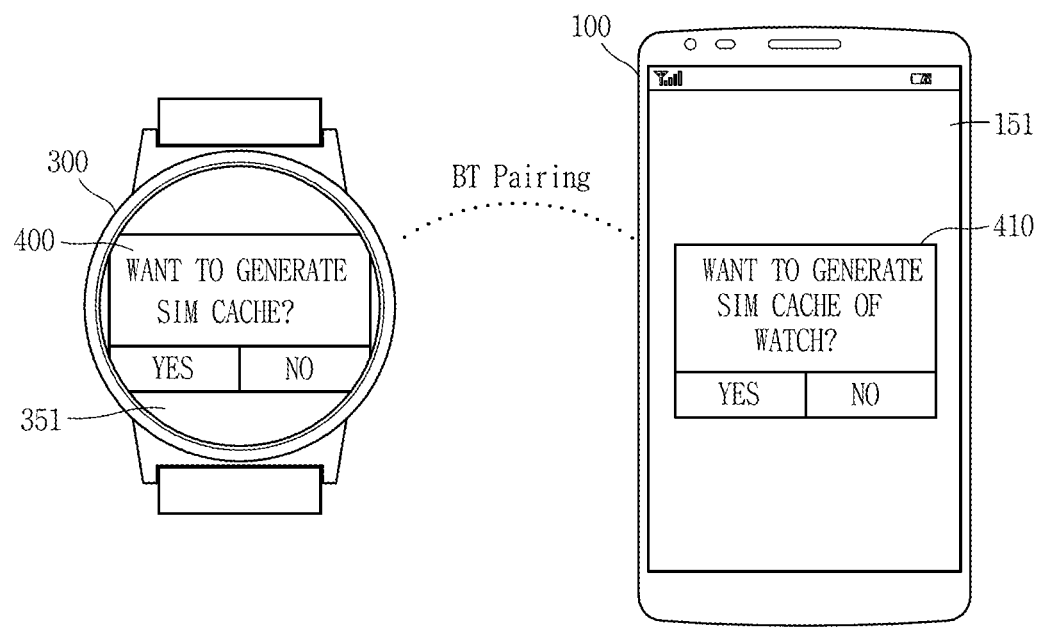
FIGS. 4A, 4B, 4C, and 4D are conceptual views illustrating a way in which a watch type terminal interworks with an external device.

Here, the control unit 380 of the watch type terminal 300 may determine whether identification information of the watch type terminal 300 exists in the mobile terminal 100. When identification information of the watch type terminal 300 does not exist in the mobile terminal 100, the control unit 380 of the watch type terminal 300 may transmit the identification information of the watch type terminal 300 to the mobile terminal 100 interworking with the watch type terminal 300. The mobile terminal 100 may receive the identification information of the watch type terminal 300 according to a user selection. In detail, as illustrated in FIG. 4A, a pop-up window 410 asking whether to receive the identification information of the watch type terminal 300 may be output on the display unit 151 of the mobile terminal 100. In this case, the user may select reception of the identification information through the pop-up window 410.

When the user selects reception of the identification information, the mobile terminal 100 receives the identification information and stores the same. In this case, the mobile terminal 100 may perform communication in place of the watch type terminal on the basis of the identification information.

When the user does not select reception of the identification information, the mobile terminal 100 may not receive the identification information. In this case, it is not possible for the mobile terminal 100 to perform communication in place of the watch type terminal 300.

Conversely, the control unit 380 may receive identification information from the mobile terminal 100. In this case, like the mobile terminal 100, the watch type terminal may select reception of the identification information according to a user selection. That is, as illustrated in FIG. 4A, a pop-up window 400 for selecting whether to receive the identification information may be output on the display unit 351 of the watch type terminal.

Meanwhile, in a case in which it is determined that identification information is present in the mobile terminal interworking with the watch type terminal 300, the control unit 380 may select whether to perform communication through the mobile terminal 100 in response to the interworking with the watch type terminal 300.

That is, when it is determined that the identification information of the watch type terminal 300 exists in the mobile terminal 100, the control unit 380 may determine whether to perform communication through the mobile terminal 100 in place of the watch type terminal.

Here, when it is determined that identification information exists in the mobile terminal 100, the control unit 380 may determine whether to perform communication through the mobile terminal 100 or whether to perform communication through the mobile terminal 100 by the user.

Figure 4B:
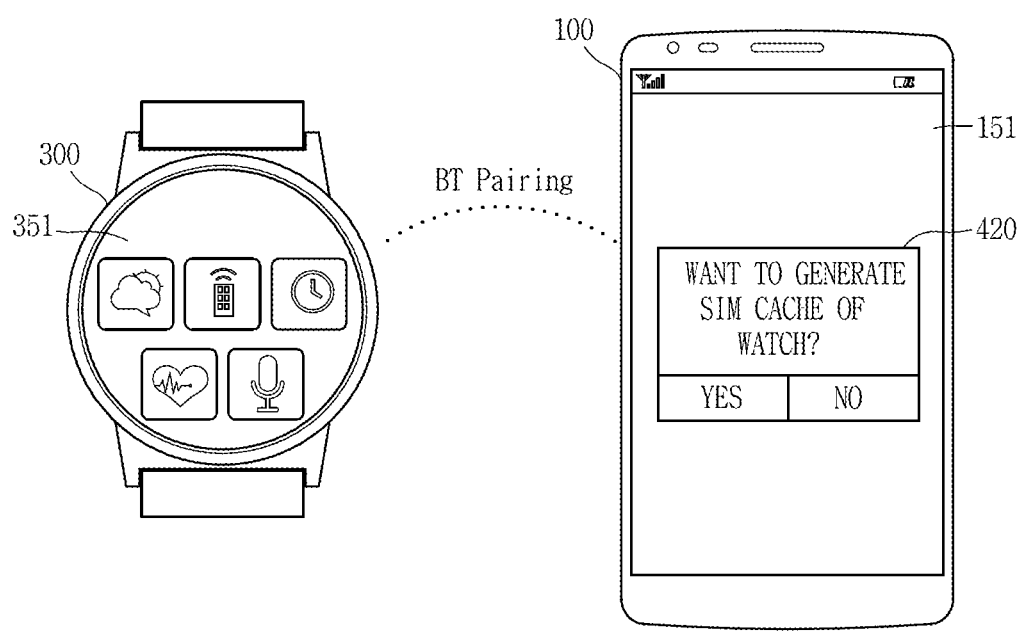

Whether to perform communication of the mobile terminal 100 is determined by the user, as illustrated in FIG. 4B, the control unit 380 may output a pop-up window 420 asking whether to perform communication on the basis of the identification information of the watch type terminal 300 on the display unit 151 of the mobile terminal 100. The user may determine whether to perform communication through the display unit 151 of the mobile terminal 100.

When communication is performed through the mobile terminal 100, the control unit 380 may provide control such that notification information indicating that communication will be performed through the mobile terminal 100 is output on the display unit 151 of the mobile terminal.

Figure 4C:
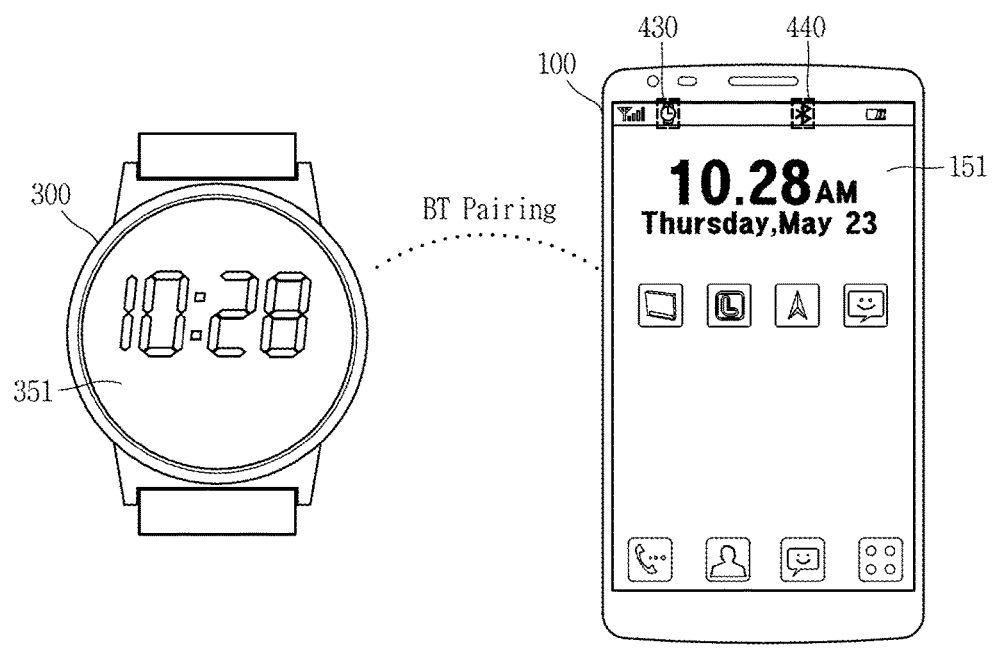

For example, as illustrated in FIG. 4C, when the mobile terminal 100 interworking with the watch type terminal 300 performs communication in place of the watch type terminal 300, the mobile terminal 100 may output a graphic object 430 denoting that the mobile terminal 100 performs communication in place of the watch terminal 300, on a region of the display unit 151.

Also, as illustrated in FIG. 4C, the mobile terminal 100 may also display a graphic object 440 denoting that the mobile terminal 100 interworks with the watch type terminal 300 on a region of the display unit.

Meanwhile, when communication is performed through the mobile terminal 100, the control unit 380 may deactivate the display unit 351. That is, the control unit 380 may limit execution of the functions other than the interworking function with the mobile terminal 100. For example, even though information is received by the watch type terminal 300 from an external server, the control unit 380 may limit receiving of the information and may receive information through the mobile terminal 100.

Also, the control unit 380 may activate at least a portion of the display unit 351 to display time information.

When communication is performed through the mobile terminal 100, the control unit 380 may display time information on at least a portion of the display unit 351.

That is, in an exemplary embodiment of the present disclosure, even though the watch type terminal 300 performs communication through the mobile terminal 100 which interworks therewith, the watch type terminal 300 may execute the function intrinsic to the watch to provide time information, while battery consumption is reduced through the external device.

In addition, when interworking with the mobile terminal 100 is released, the control unit 380 may control the mobile terminal 100 not to perform communication any longer.

Figure 4D:
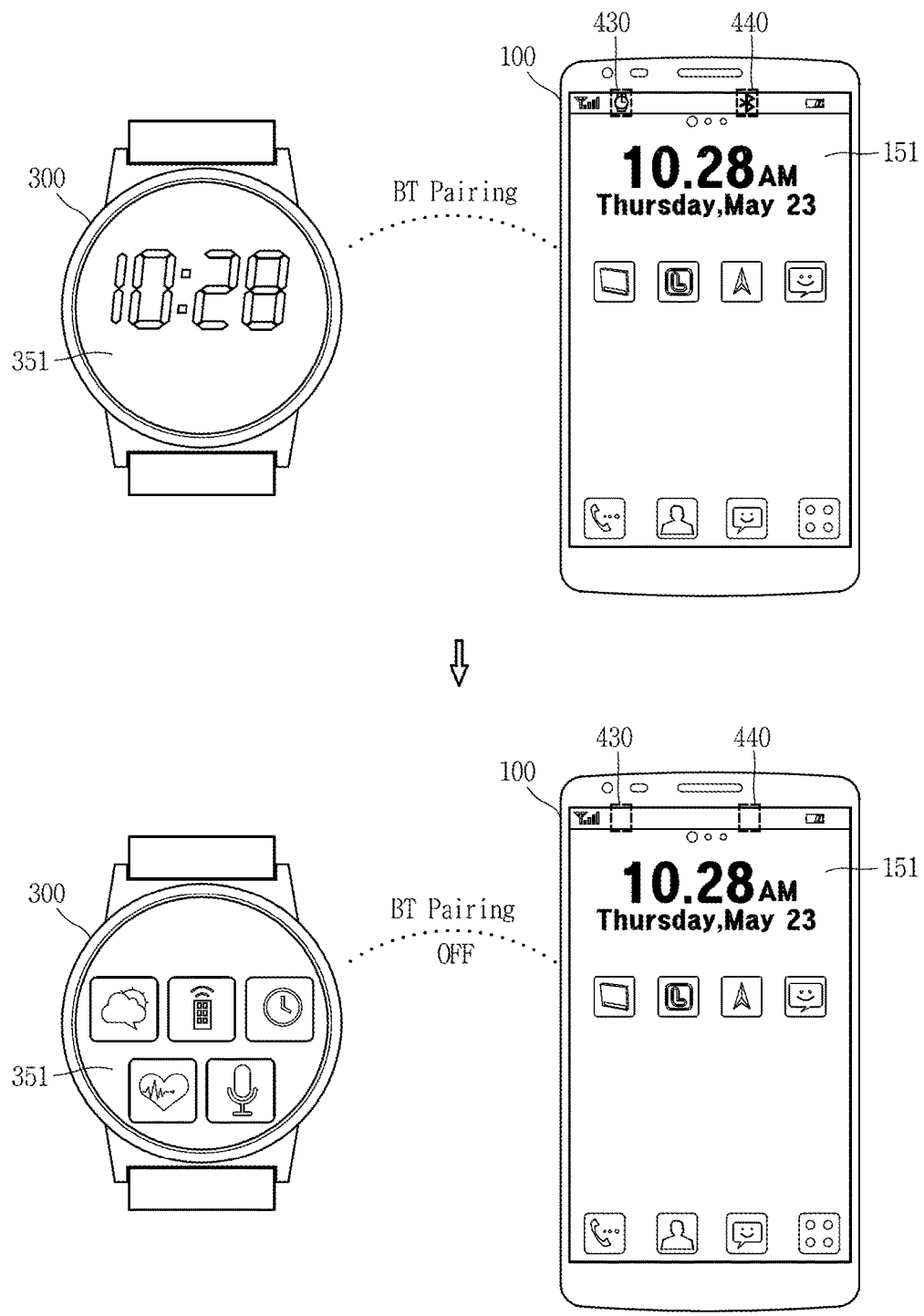

In this case, the control unit 380 may output graphic objects denoting at least a portion of functions that may be executed in the watch type terminal 300, on the display unit 351, instead of time information. For example, as illustrated in FIG. 4D, the control unit 380 may output icons on the display unit 351. That is, when communication is not performed through the mobile terminal 100 any longer, the control unit 380 may switch to a state in which the functions, which were limited when interworking with the mobile terminal 100, can be executed.

Also, as illustrated in FIG. 4D, the graphic object 430 denoting that the watch type terminal is performing communication through the mobile terminal 100 and the graphic object 440 denoting that the mobile terminal 100 is interworking with the watch type terminal 300 may disappear from the display unit 151 of the mobile terminal 100.

Accordingly, the watch type terminal 300 may perform communication through an external device interworking with the watch type terminal.

Hereinafter, a method of releasing interworking with an external device, while the watch type terminal is performing communication through the external device which interworks with the watch type terminal will be described.

Figure 5A:
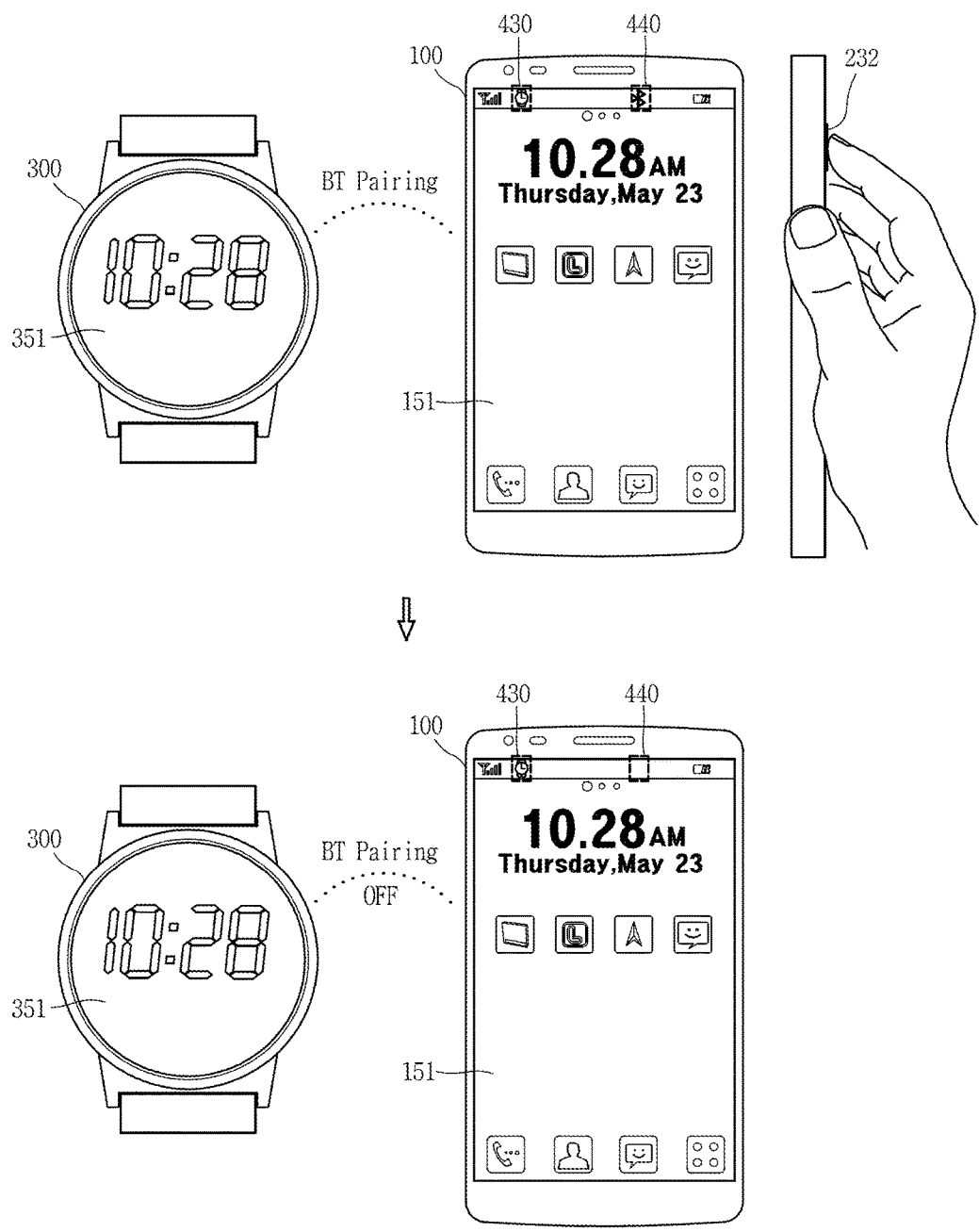
FIGS. 5A, 5B, and 5C are conceptual views illustrating a way in which a watch type terminal is released from interworking, while the watch type terminal has been performing communication through an external device which interworks with the watch type terminal.
Figure 5B:
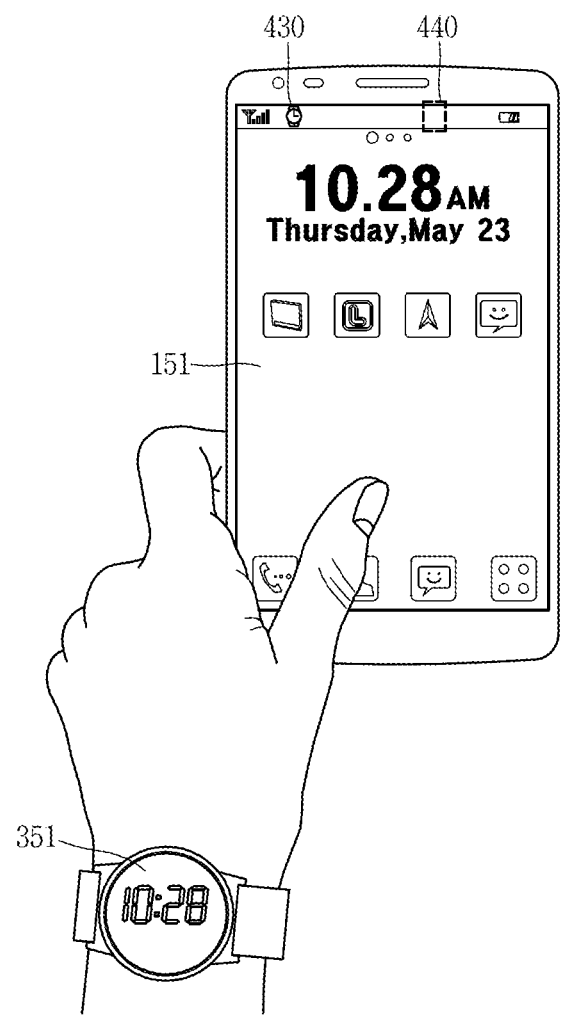
Figure 5C:
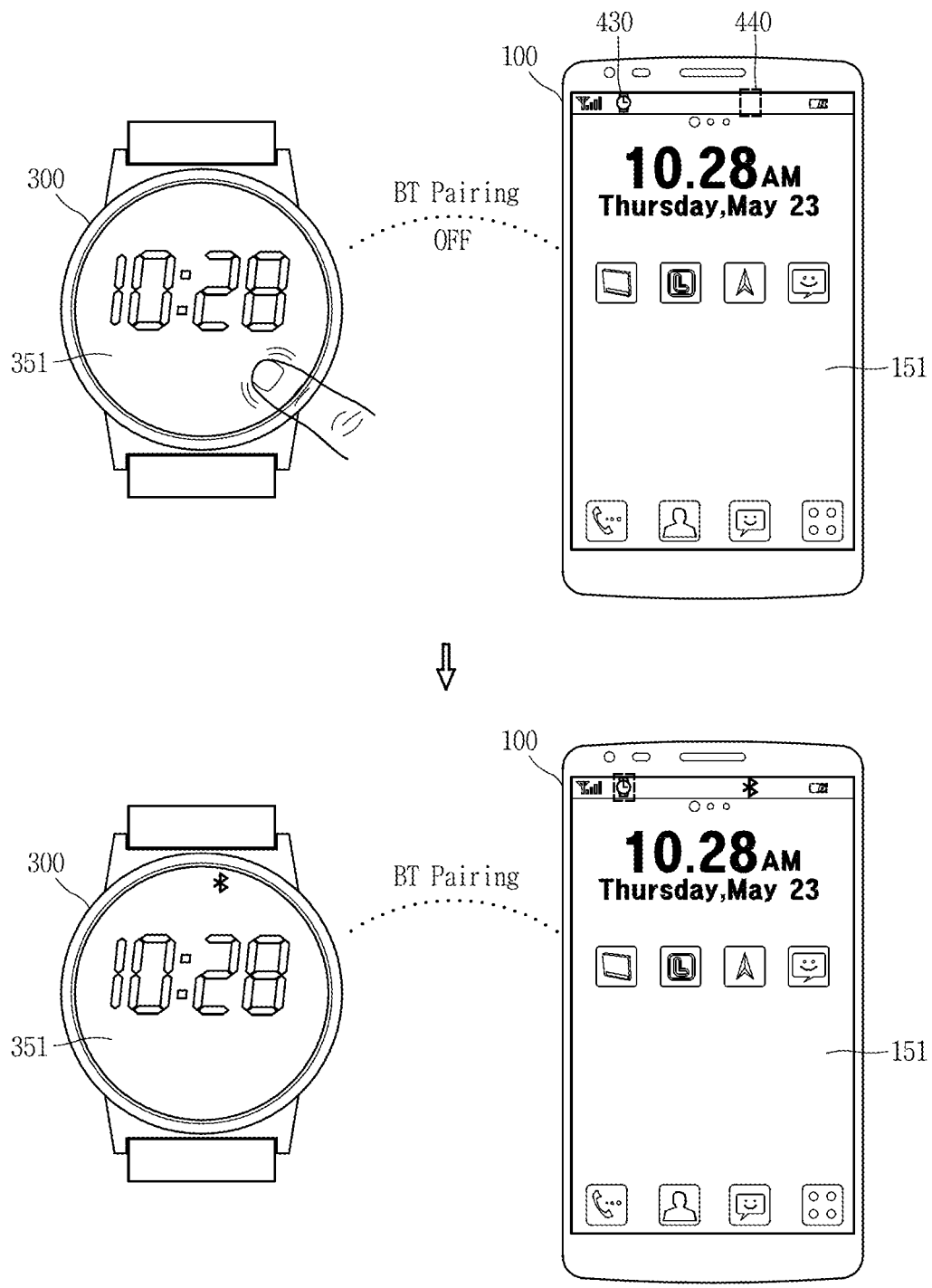

FIGS. 5A, 5B, and 5C are conceptual views illustrating a way in which a watch type terminal is released from interworking, while the watch type terminal has been performing communication through an external device which interworks with the watch type terminal.

The watch type terminal 300 according to an exemplary embodiment of the present disclosure may perform communication through an external device 100 interworking with the watch type terminal.

Here, in a state in which the watch type terminal 300 is worn on the user's wrist, the watch type terminal 300 may sense that the mobile terminal 100 interworking with the watch type terminal 300 is in use. Here, the watch type terminal 300 may release interworking with the mobile terminal 100 in order to reduce battery consumption.

That is, when a preset condition is met, the control unit 380 of the watch type terminal 300 may release the interworking with the mobile terminal and deactivate the second communication unit 320 performing the interworking. The preset condition may be a condition related to a usage stage of the external device. For example, the preset condition may be whether a user input is continuously received by the external device, whether user's eyes are sensed by the external device, whether an electrocardiogram sensed by the external device is identical to that sensed by the watch type terminal, whether the eternal device and the watch type terminal may be available to perform communication through human body communication, and the like.

When a user input is continuously received by the external device, it may mean that a user input is continuously received before a preset period of time has lapsed. For example, as illustrated in FIG. 5A, the external device may be the mobile terminal 100. The mobile terminal 100 may include a user input unit for receiving a user input. The user input unit may be disposed on at least one of a front surface, a side surface, and a rear surface of the mobile terminal 100.

Here, as illustrated in FIG. 5A, when it is sensed that a user input is applied to the user input unit 232 disposed on the rear surface of the mobile terminal, the control unit of the mobile terminal 100 may transmit information related to a usage stage of the mobile terminal 100 to the watch type terminal 300 interworking with the mobile terminal 100.

When the information related to a usage stage is received, the watch type terminal 300 may release interworking with the mobile terminal 100 on the basis of the information related to a usage state.

Here, even though the mobile terminal 100 is released from the state of interworking with the watching terminal 300, the mobile terminal 100 may continue to perform communication in place of the watch type terminal 300. Also, even though the watch type terminal 300 is released from the state of interworking with the mobile terminal 100, the watch type terminal 300 may not activate the first communication unit 310 and may not perform communication. That is, when it is determined that the mobile terminal 100, which has interworked with the watch type terminal 300, is continuously used by the user, the watch type terminal 300 may perform communication through the mobile terminal 100 in place of the watch type terminal 300.

Meanwhile, when a user input is not sensed within a preset period of time, the control unit of the mobile terminal 100 may not perform communication, in place of the watch type terminal 300, any longer. In this case, the control unit of the mobile terminal 100 may determine that the user does not use the mobile terminal 100 any longer, and may not perform communication in place of the watch type terminal 300.

Also, after the interworking with the mobile terminal 100 is released, the watch type terminal 300 may have a preset period and may receive information related to a usage state of the mobile terminal 100 through the second communication unit 320. In this case, the watch type terminal 300 may reduce battery consumption, compared with a state in which the second communication unit 320 is continuously activated.

As the second communication 320 is periodically activated, the watch type terminal 300 may receive information related to a usage state of the mobile terminal 100 and determine whether to activate the first communication unit 310 on the basis of the information related to the usage state. In detail, in a case in which the mobile terminal 100 is continuously used, the watch type terminal 300 may maintain a deactivated state of the first communication unit 310, and when the mobile terminal 100 is not used, the watch type terminal 300 may activate the first communication unit 310.

Also, a usage state of the mobile terminal 100 may be determined according to whether a user input is continuously received through the user input unit, and may be determined according to whether the user's eyes are sensed through a camera unit provided in the mobile terminal 100. In this case, the watch type terminal 300 may receive information regarding whether the user's eyes are sensed, from the mobile terminal 100, and determine whether to release the interworking with the mobile terminal on the basis of the information regarding whether the user's eyes are sensed.

Meanwhile, whether to release the interworking between the watch type terminal 300 and the mobile terminal 100 may be determined by the control unit 380 of the watch type terminal 300 or may be determined by the control unit of the mobile terminal 100.

Also, the watch type terminal 300 may determine a usage state of the mobile terminal 100 according to a state in which the watch type terminal 300 is worn on the user's wrist.

For example, the watch type terminal 300 may receive user's electrocardiogram information measured by the mobile terminal 100 and determine whether the received electrocardiogram information and electrocardiogram information which has been measured by the watch type terminal 300 are identical. Here, when both electrocardiogram information are identical, the control unit 380 of the watch type terminal 300 may determine that the mobile terminal 100 is a main device mainly used by the user, and release interworking with the mobile terminal 100 in order to reduce battery consumption of the watch type terminal 300.

In another example, as illustrated in FIG. 5B, the watch type terminal 300 may determine whether to release interworking of the watch type terminal 300 through human body communication with the mobile terminal 100.

The human body communication refers to communication performed between the watch type terminal 300 and the external device by using part of a human body as a medium. For example, as illustrated in FIG. 5B, the watch type terminal 300 may perform communication by transmitting a current to the external device in contact with the user's wrist by the medium of the user's wrist in contact with the watch type terminal 300.

Even though the preset condition is met so interworking between the watch type terminal and the mobile terminal 100 is released, the mobile terminal 100 may continue to receive information related to the watch type terminal 300. In this case, the first communication unit 310 of the watch type terminal 300 may be maintained in the deactivated state.

Here, the control unit 380 of the watch type terminal 300 may periodically perform human body communication. The control unit 380 may determine whether to activate the first communication unit 310 according to whether it is possible to perform human body communication. In detail, when it is possible to perform human body communication, the control unit 380 may maintain the first communication unit 310 in the deactivated state, and when it is not possible to perform human body communication, the control unit 380 may activate the first communication unit 310.

Also, in a state in which the first and second communication units 310 and 320 are deactivated, the control unit 380 of the watch type terminal 300 may activate at least one of the first and second communication units 310 and 320 according to a user request. That is, in a state in which the watch type terminal 300 is performing communication through the external device interworking with the watch type terminal 300, the watch type terminal 300 may terminate communication any time according to a user request and perform communication through the communication unit of the watch type terminal 300.

For example, as illustrated in FIG. 5C, in a state in which the first and second communication units 310 and 320 are deactivated, when a preset type of touch is sensed, the control unit 380 of the watch type terminal 300 may activate the second communication unit 320 and interwork with the external device.

Here, in a state in which the interworking is released through the second communication unit 320, when information related to the watch type terminal 300 is received by the mobile terminal 100, the watch type terminal 300 may receive the information related to the watch type terminal 300 through the second communication unit 320.

In an exemplary embodiment of the present disclosure, in a case in which the watch type terminal and the mobile terminal are used together, interworking between the watch type terminal and the mobile terminal is released to reduce battery consumption according to the interworking.

Hereinafter, a method of indicating a consumption data amount of information items displayed on the display unit of the watch type terminal will be described.

Figure 6A:
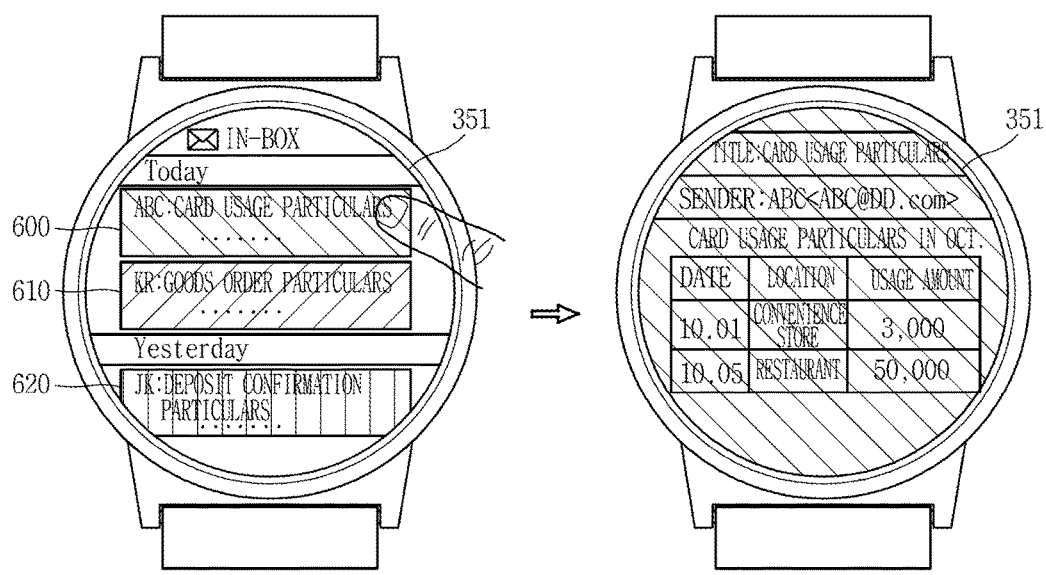
FIGS. 6A and 6B are conceptual views illustrating a method of indicating a consumption data amount of information items displayed on a display unit of a watch type terminal.
Figure 6B:
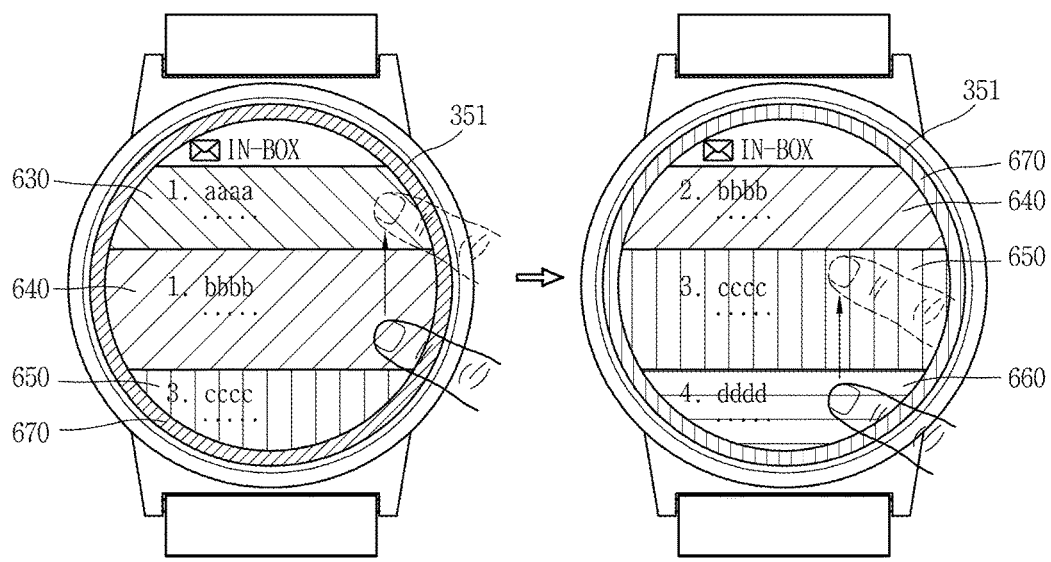

FIGS. 6A and 6B are conceptual views illustrating a method of indicating a consumption data amount of information items displayed on a display unit of a watch type terminal.

The watch type terminal 300 according to an exemplary embodiment of the present disclosure may display information on the display unit 351 of the watch type terminal 300. The information may include various types of information that may be displayed on the display unit 351, such as an image, a character, a graphic object, a list of information items, and the like.

Also, the information may be information present in a memory unit of the watch type terminal 300 or may be information received by the watch type terminal 300 through network communication. For example, the received information may be information or notification of an SMS, an MMS, a message of a messenger application. In a case in which information is received through network communication, the watch type terminal 300 may selectively receive information satisfying a preset condition through the first communication unit 310. For example, the watch type terminal 300 may calculate a consumption data amount of the information in advance and selectively only information having a consumption data mount smaller than a preset data amount.

The preset condition may be set by the user. For example, the preset condition may include whether information received from a preset external device includes particular information, whether the information received from the preset external device has a set priority, and the like. For example, when the information is a mail, the control unit 380 may selectively receive the mail in a case in which the mail has been received from a particular sender.

Meanwhile, whether information received through network communication satisfies the preset condition may be determined by the control unit 380 of the watch type terminal 300 or may be determined by the external server. In a case in which whether information received through network communication satisfies the preset condition is determined by the control unit 380, the control unit 380 may receive the information and delete the same from the memory unit.

In a case in which whether information received through network communication satisfies the preset condition is determined by the external server, the control unit 380 may receive only a portion of information such as a data amount, rather than receiving the entirety of the information. That is, through the portion of the information such as a data amount, the control unit 380 may determine whether to receive the entirety of the information.

Also, at least a portion of the information displayed on the display unit 351 may be associated with a function related to the information. For example, the function related to the information may be a function to access a Web page previously connected to the information. In detail, the function to enter a link previously connected to the information refers to accessing a uniform resource locator (URL) address previously connected to the information, in a state in which the URL address representing the information is accessed.

Here, the control unit 380 may previously detect a consumption data amount for executing the function related to the information. The consumption data amount may refer to a data amount consumed for executing the function related to the information. In detail, the control unit 380 may detect consumption data amount required for accessing a Web page previously connected to the information. Here, the consumption data amount may be detected by the control unit 380 or may be calculated by an external server required for executing the function related to the information. When the consumption data amount is calculated by the external server, the control unit 380 may receive only partial information including a data amount before the function related to the information is executed, from the external server, and may detect consumption data amount of the function related to the information on the basis of the received information.

Also, the control unit 380 may calculate a battery consumption amount by using the detected consumption data amount. Here, as the consumption data amount increases, the battery consumption amount may increase.

The control unit 380 may control the display unit 351 to display information in different manners according to consumption data amounts. That is, on the basis of the consumption data amount, the control unit 380 may determine an output form of the information. The output form of the information may be a color, contrast, a shape, and the like, output on the display unit.

For example, as illustrated in a first drawing of FIG. 6A, at least a portion of a list including a plurality of mails may be output on the display unit 351. That is, a list including a first mail 600, a second mail 610, and a third mail 620 may be output on the display unit 351. Here, the control unit 280 may control the display unit 351 to display the first, second, and third mails to have different contrast on the basis of consumption data amounts. Accordingly, the user of the watch type terminal 300 may recognize consumption data amounts according to the output forms of the information displayed on the display unit 351. Also, in case of a large consumption data amount, the user may not execute a function related thereto, thus reducing a battery consumption amount.

When a touch is applied to any one mail 600 among the first, second, and third mails 600, 610, and 620 output on the display unit 351, the control unit 380 may output screen information related to the any one mail 600. The screen information related to the any one mail 600 may include contents of the any one mail 600. Also, the screen information related to the any one mail 600 may be a screen of a URL address related to the any one mail 600.

Here, the control unit 380 may display the screen information related to the any one mail 600, in the same output form as that of the any one mail 600. For example, as illustrated in a second drawing of FIG. 6A, the control unit 380 may control the display unit 351 to have the same contrast as that of the any one mail 600. Accordingly, in an exemplary embodiment of the present disclosure, the user may recognize how much the battery is currently consumed.

Also, the control unit 380 may output a graphic object to an edge region of the display unit 351 on the basis of a consumption data amount estimated to execute the function related to the information.

For example, as illustrated in a first drawing of FIG. 6B, the control unit 380 may output an annular graphic object 670 in an edge region of the display unit 351, reflecting consumption data amount of the displayed information. That is, the control unit 380 may determine contrast of the annular graphic object 670 on the basis of the consumption data amount of the information displayed on the display unit 351.

Meanwhile, a plurality of information items 630, 640, and 650 may be displayed on the display unit 351. The plurality of information items 630, 640, and 650 may have different consumption data amounts. Also, the plurality of information items 630, 640, and 650 may be displayed with different contrast on the display unit 351 on the basis of the different consumption data amounts.

Here, on the basis of a consumption data amount regarding any one 640 among the plurality of information items 630, 650, and 650, the control unit 380 may determine an output form of the annular graphic object 670. For example, as illustrated in a first drawing of FIG. 6B, the control unit 380 may determine contrast of the annular graphic object 670 on the basis of consumption data amount of the information 640 displayed in the central region among the plurality of information items 630, 650, and 650 displayed on the display unit 351. That is, the contrast of the annular graphic object 670 and the contrast of the information 640 displayed in the central region may be the same.

Meanwhile, in response to a scroll request from the user, the control unit 380 may scroll the plurality of information items 630, 650, and 650 displayed on the display unit 351. Here, after the plurality of information items 630, 650, and 650 are scrolled, the control unit 380 may detect the information 650 displayed in the central region, and change the contrast of the annular graphic object 670 on the basis of the consumption data amount of the detected information 650 displayed in the central region. For example, as illustrated in a second drawing of FIG. 6B, when the information displayed in the central region is changed according to scrolling, the control unit 380 may change the contrast of the annular graphic object 670 on the basis of a consumption data amount of the information 650 displayed in the changed region.

In the above, the method of enabling a user to recognize a consumption data amount of information displayed on the watch type terminal has been described. In this manner, the user may recognize a consumption data amount and selectively execute a function related to information, thereby effectively using the battery.

Hereinafter, a method of executing a function related to any one information item among a plurality of information items when the plurality of information items are displayed on the display of the watch type terminal.

Figure 7A:
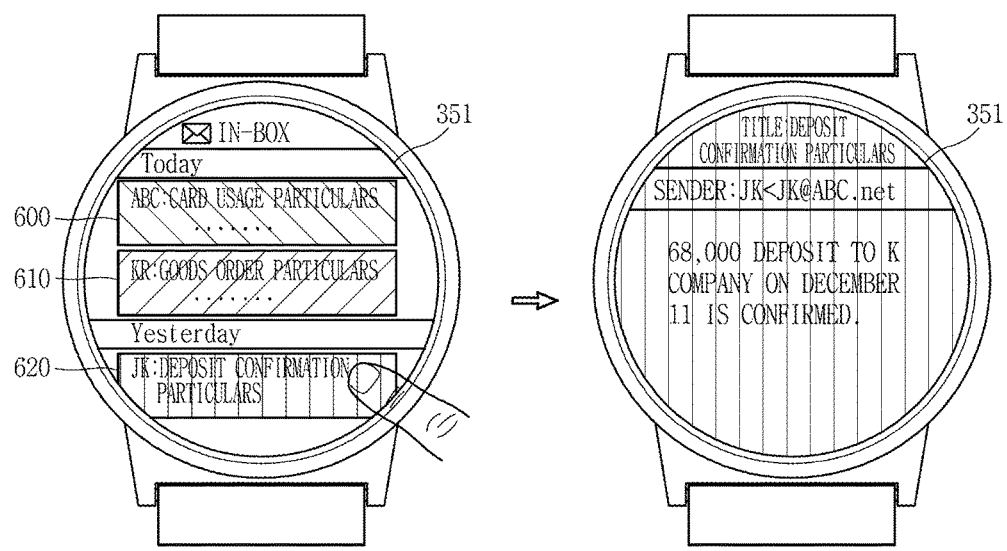
FIGS. 7A and 7B are conceptual views illustrating a method of executing a function related to any one information item among a plurality of information items when the plurality of information items are displayed on a display unit of a watch type terminal.
Figure 7B:
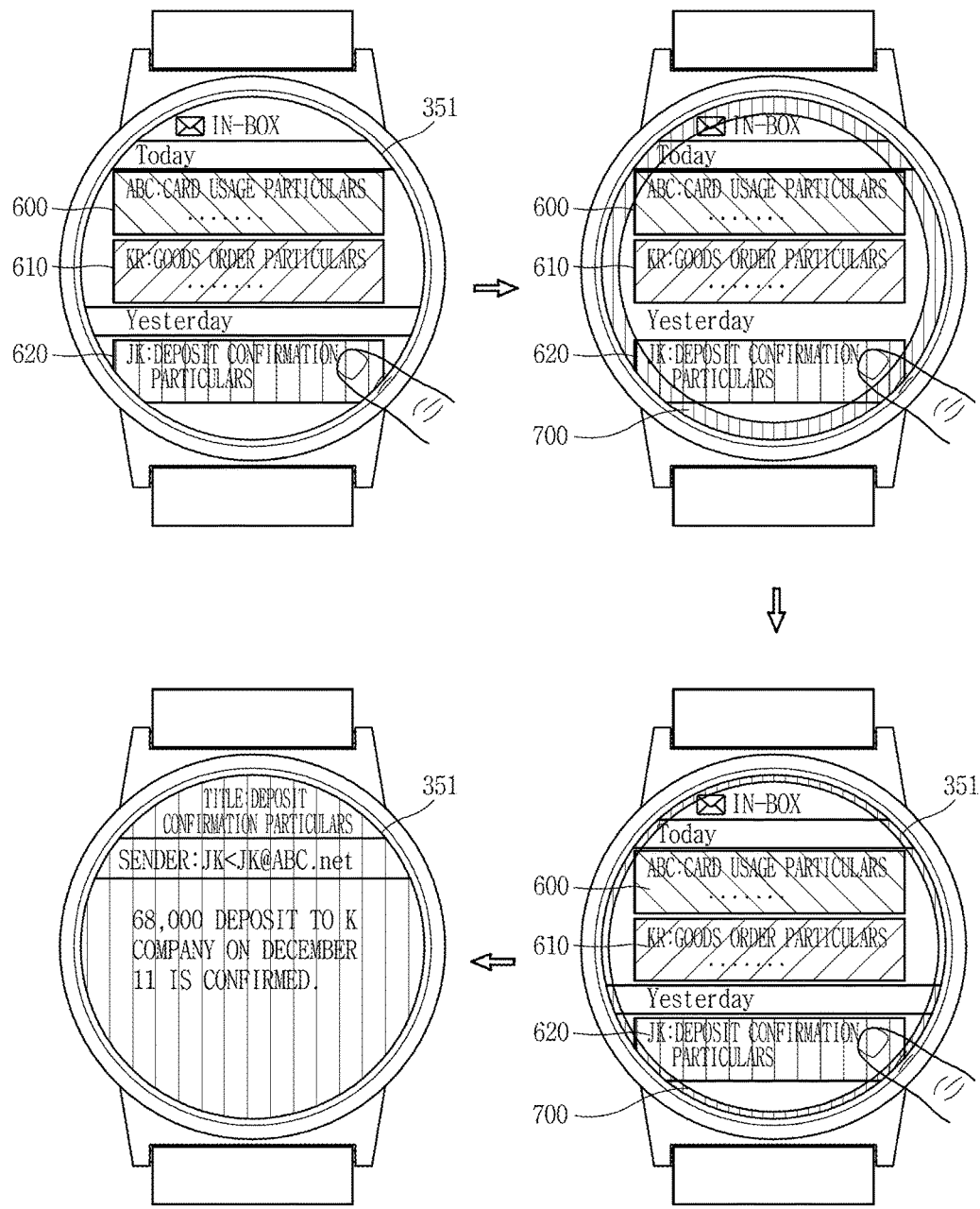

FIGS. 7A and 7B are conceptual views illustrating a method of executing a function related to any one information item among a plurality of information items when the plurality of information items are displayed on a display unit of a watch type terminal.

When a function required for performing communication is executed through the first communication unit, the watch type terminal 300 according to an exemplary embodiment of the present disclosure may execute the function though different control commands according to a consumption data amount consumed for execution of the function.

The function required for performing communication may be a function to receive information from an external server, a function to access a URL address and provide an accessed screen, and the like.

In detail, in case of a function having a large consumption data amount, the control unit 380 may control to perform the function through a control command having a long duration of a touch, and in case of a function having a small consumption data amount, the control unit 380 may control to perform the function through a control command having a short duration of a touch.

That is, in a case in which consumption data amount estimated to execute a function related to information is a first data amount, the control unit 380 may execute a function related to the information in response to a short touch, and in a case in which consumption data amount estimated to execute a function related to information is a second data amount larger than the first data amount, the control unit 380 may execute a function related to the information in response to a long touch.

The control method will be described in more detail with reference to the accompanying drawings. As illustrated in a first drawing of FIG. 7A, in a state in which first, second and third mails 600, 610, and 620 are displayed on the display unit 351, when a touch is applied to a region in which any one main 620 is displayed, for a preset period of time, the control unit 380 may execute a function related to the any one mail 620.

Here, the duration of the touch may be determined by a consumption data amount of a function related to information displayed on the region to which the touch has been applied. In detail, the control unit 380 may determine a duration of a touch for executing a function related to each mail on the basis of a consumption data amount of each of the first, second, and third mails 600, 610, and 620.

For example when a consumption data amount of the first mail 600 is greater than a consumption data amount of the second mail 610, the control unit 380 may set a duration of a touch for executing a function related to the first mail 600 such that it is longer than a duration of a touch for executing a function related to the second mail 610. Conversely, when the consumption data amount of the first mail 600 is smaller than the consumption data amount of the second mail 610, the control unit 380 may set a duration of a touch for executing a function related to the first mail 600 such that it is shorter than the duration of a touch for executing a function related to the second mail 610.

When a duration of a touch determined according to the consumption data amount is sensed with respect to any one of the first, second, and third mails 600, 610, and 620, the control unit 380 may execute a function related to the any one mail.

For example, as illustrated in a second drawing of FIG. 7A, when a touch applied to the third mail 620 for a predetermined duration is sensed, the control unit 380 may display contents of the third mail 620.

Here, the control unit 380 may determine an output form of an execution screen of the function related to the third mail, by reflecting a consumption data amount of the third mail. For example, as illustrated in a second drawing of FIG. 7A, the control unit 380 may display the executed screen of the function related to the third mail 620 to have the contrast reflecting the consumption data amount.

Accordingly, the user may recognize that the current consumption data amount is large, and thus, the user may terminate the currently executed function or perform controlling such as turning off the display unit 351 of the watch type terminal, or the like, to reduce a battery consumption amount.

In addition, in order to execute information displayed on the display unit 351, the control unit 380 may output notification information such that the user recognizes that a touch should be maintained for more than a preset period of time.

For example, as illustrated in a first drawing of FIG. 7B, the in a state in which a list including first, second, and third mails 600, 610, and 620 is output on the display unit 351, the control unit 380 may sense a touch applied to the third mail 620.

As illustrated in a second drawing of FIG. 7B, the control unit 380 may output an annular graphic object 700 reflecting a consumption data amount of the third mail 630 in the edge region of the display unit 351. Here, the output form of the graphic object 700 may be determined according to the consumption data amount. For example, as the consumption data increases, the control unit 380 may increase a thickness of the annular graphic object 700.

Also, the form of the graphic object 670 may be changed with the lapse of a duration of the touch. For example, as illustrated in second and third drawings of FIG. 7B, the control unit 380 may change the thickness of the graphic object 700 such that it gradually decreases on the basis of a duration in which a touch is applied. Accordingly, the user may recognize that the touch should be continued for a predetermined period of time to execute a function related to the information to execute the function related to the information, and recognize the lapse of the duration of the touch as well.

When the touch is applied for more than a preset period of time, the control unit 380 may execute a function related to the information. For example, as illustrated in a fourth drawing of FIG. 7B, when a duration of the touch applied to the third mail 620 is more than the preset period of time, the control unit 380 may display contents of the third mail 620 on the display unit 351.

In the above, the method of enabling the user to recognize a consumption data amount consumed by each information when a plurality of information items are displayed on the watch type terminal has been described. In this manner, the user may recognize a consumption data amount and use the watch type terminal such that battery consumption is reduced according to the consumption data amount.

Hereinafter, a method of displaying log information related to performing communication when a watch type terminal performs communication through an external device will be described.

Figure 8A:
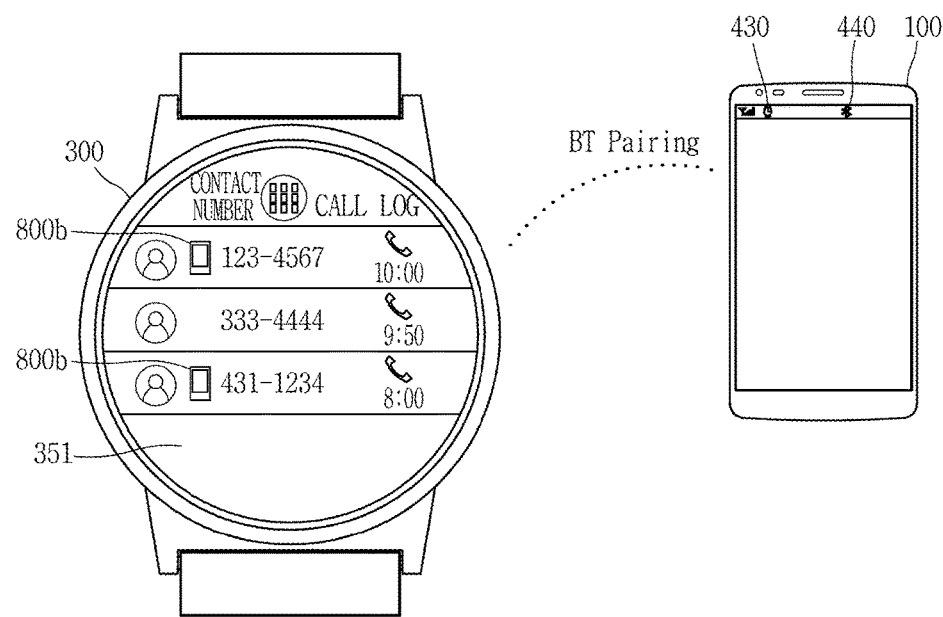
FIGS. 8A and 8B are conceptual views illustrating a way in which a watch type terminal displays log information related to performing communication when the watch type terminal performs communication through an external device.
Figure 8B:
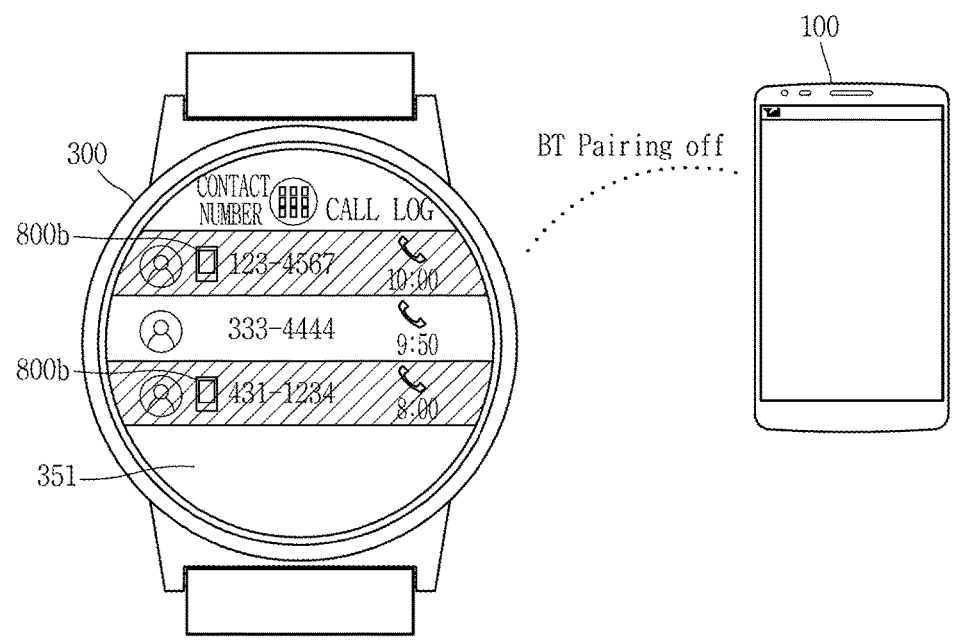

FIGS. 8A and 8B are conceptual views illustrating a way in which a watch type terminal displays log information related to performing communication when the watch type terminal performs communication through an external device.

The watch type terminal 300 according to an exemplary embodiment of the present disclosure may interwork with an external device positioned within a preset distance, and perform communication through the interworking external device. In detail, the watch type terminal 300 may interwork with the external device through the second communication unit 320 and perform communication, which has been performed through the first communication unit 310, through the interworking external device, without using the first communication unit 310.

For example, the watch type terminal 300 may interwork with the mobile terminal 100 within a preset distance and receive a call signal by using the mobile terminal 100. Here, log information indicating a call signal received through the first communication unit 310 of the watch type terminal 300 and log information indicating a call signal received through the mobile terminal 100 interworking with the watch type terminal 300 may be displayed on the display unit 351 of the watch type terminal 300.

In this case, the control unit 380 may output the log information indicating a call signal received through the first communication unit 310 of the watch type terminal 300 and the log information indicating a call signal received through the mobile terminal 100 interworking with the watch type terminal 300 such that they are distinguished visually.

For example, as illustrated in FIG. 8A, the control unit 380 may output graphic objects 800a and 800b indicating call signals received from the external device in regions adjacent to the region in which the log information of the call signal of the mobile terminal 100 interworking with the watch type terminal 300 is displayed such that they are distinguished from the log information of the call signal received by the first communication unit 310 of the watch type terminal 300 on the display unit 351. Accordingly, the user may recognize the information obtained by performing communication through the communication unit of the external device in a state in which the watch type terminal interworks.

Meanwhile, the log information may be output in different manners according to states of interworking between the watch type terminal and the external device. In detail, when the watch type terminal interworks with the external device, the control unit 380 may display log information indicating a call signal received through the external device, in an activated state such that the log information may be selected, and when the watch type terminal does not interwork with the external device, the control unit 380 may display the log information indicating the call signal received through the external device, in a deactivated state such that the log information may not be selected.

Here, the activated state may be a state in which the a touch is applied to the log information indicating the call signal to select the log information and it is possible to execute a function related to the selected call signal, and the deactivated state may be a state in which it is not possible to select the log information even though a touch is applied to the log information indicating the call signal, and thus, it is not possible to execute the function related to the call signal.

For example, as illustrated in FIG. 8A, in a case in which the watch type terminal 300 interworks with the mobile terminal 100, the control unit 380 may display information indicating a call signal received through the mobile terminal 100 such that the information is in an activated state. Conversely, as illustrated in FIG. 8B, in a case in which interworking between the watch type terminal 300 and the mobile terminal 100 is released, the control unit 380 may display the log information indicating the call signal received through the mobile terminal 100 such that the log information is in a deactivated state.

Accordingly, the user may recognize that the watch type terminal 300 and the mobile terminal 100 currently interwork. In addition, in an exemplary embodiment of the present disclosure, the watch type terminal 300 may inform the user that a function may be executed by using the mobile terminal 100 according to an interworking state of the mobile terminal 100.

Hereinafter, a method of performing a function related to the call signal by using log information indicating a call signal displayed on a watch type terminal will be described in detail.

FIGS. 9A, 9B, 9C, and 9D are conceptual views a method of performing a function related to a call signal displayed on a watch type terminal by using log information indicating a call signal displayed on the watch type terminal.

The watch type terminal 300 according to an exemplary embodiment of the present disclosure may interwork with an external device to perform communication through the interworking external device, and output log information indicating communication history performed through the interworking external device and log information indicating communication history performed through the communication unit of the watch type terminal 300, on the display unit 351 of the watch type terminal 300.

Also, the control unit 380 of the watch type terminal 300 may perform various controlling by using the log information indicating the communication history. In detail, the control unit 380 may transmit a call signal to an external terminal indicated by the log information by using the log information. Here, the log information may include information obtained by performing communication through the communication unit of the external device, as well as information obtained by performing communication through the communication unit of the watch type terminal 300.

In this case, the user may select whether a transmission subject of the call signal is the watch type terminal 300 or the external device interworking with the watch type terminal 300.

Figure 9A:
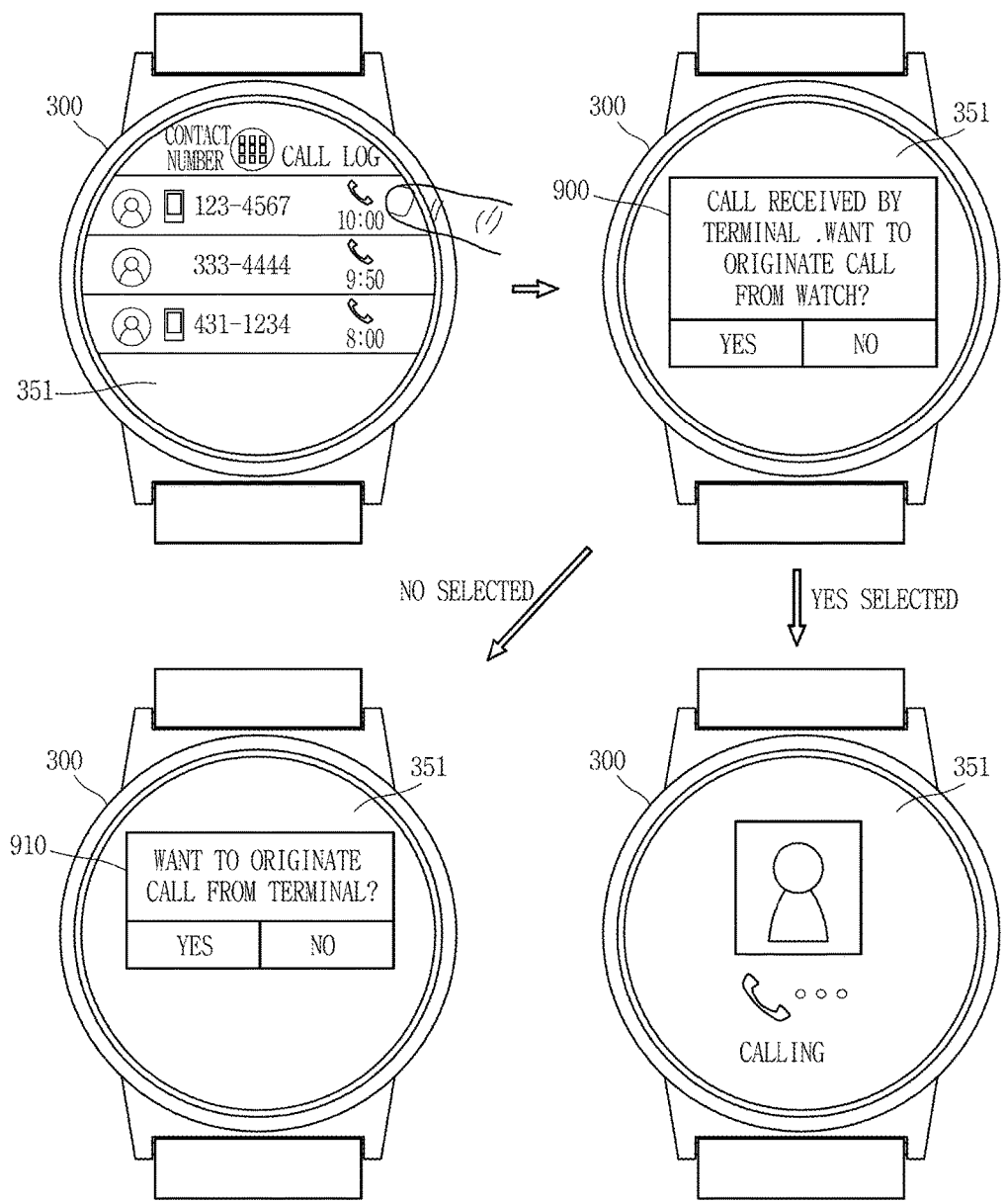
FIGS. 9A, 9B, 9C, and 9D are conceptual views a method of performing a function related to a call signal displayed on a watch type terminal by using log information indicating the call signal.
Figure 9B:
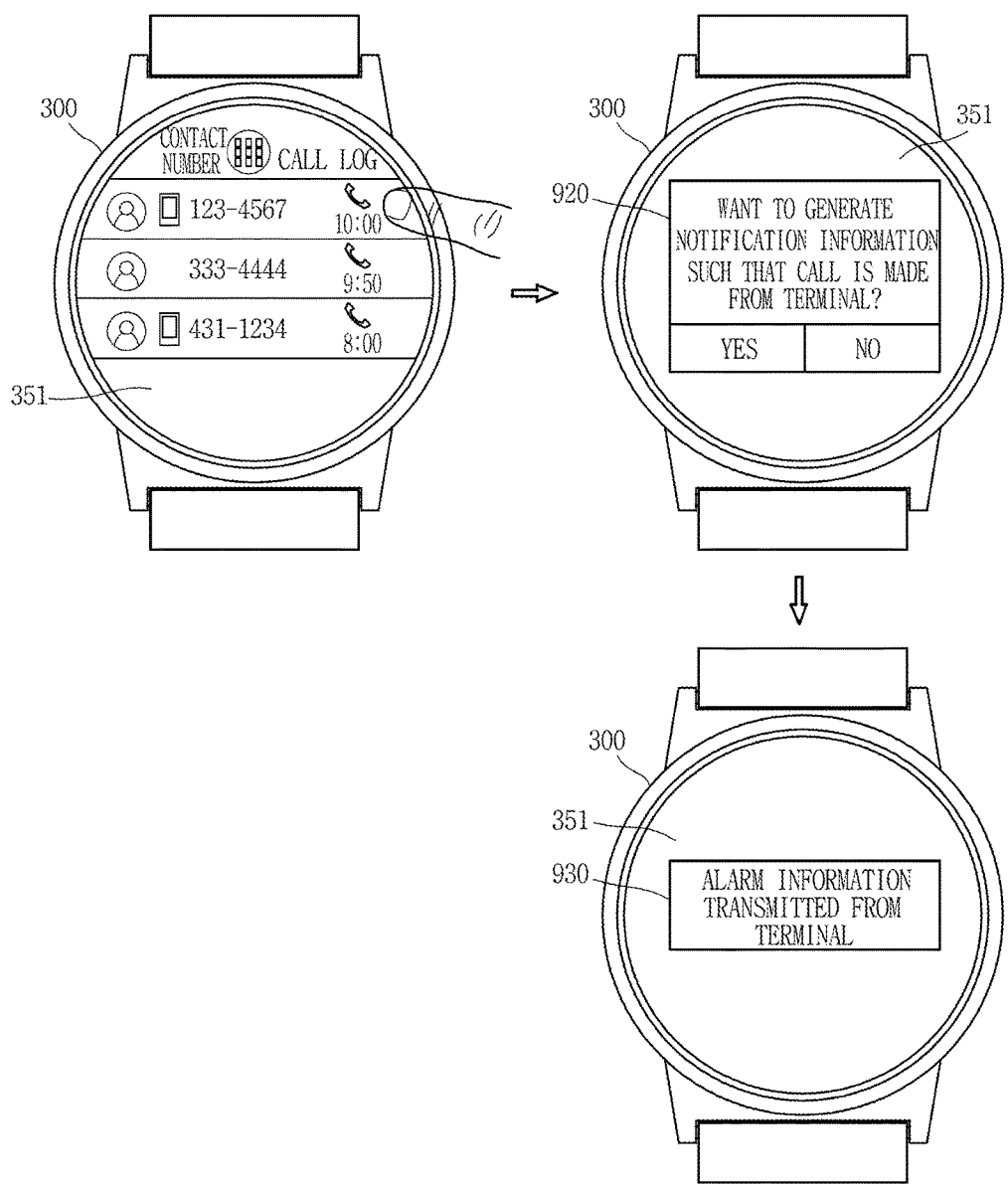
Figure 9C:
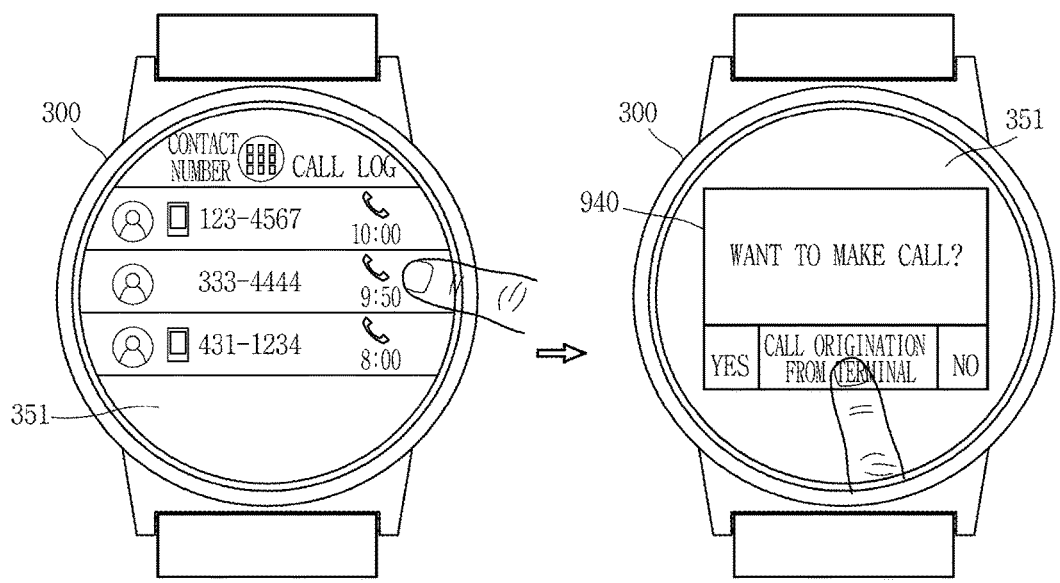

For example, as illustrated in a first drawing of FIG. 9A, in a state in which a plurality of log information items are displayed on the display unit 351, when a touch is applied to any one log information item, the control unit 380 may transmit a call signal to an external terminal indicated by the log information.

Here, as illustrated in a second drawing of FIG. 9A, the control unit 380 may output a pop-up window 900 for selecting a transmission subject of the call signal on the display unit 351. The user may select a transmission subject of the call signal through the pop-up window 900.

For example, as illustrated in a third drawing of FIG. 9A, when a subject of a call signal transmission is selected as the watch type terminal 300, the watch type terminal 300 may transmit a call signal. Conversely, as illustrated in a fourth drawing of FIG. 9A, when call origination from the watch type terminal 300 is not selected, the control unit 380 may output a pop-up window 910 allowing the user to select whether to originate a call from the external device.

Meanwhile, when a control command for transmitting a call signal through the external device is received, the control unit 380 may determine whether an external device capable of transmitting a call signal currently exists. Here, the external device may be an external device currently interworking with the watch type terminal 300 or may be an external device that may be able to interwork with the watch type terminal 300 currently.

Here, when it is determined that an external device capable of currently transmitting a call signal exists, the control unit 380 may perform controlling as illustrated in FIG. 9A. Conversely, when it is determined that an external device capable of currently transmitting a call signal does not exist, the control unit 380 may transmit notification information to the external device such that a call signal may be transmitted afterwards.

Here, the user may be allowed to select whether to transmit the notification information to the external device. For example, as illustrated in first and second drawings of FIG. 9B, when a control command for transmitting a call signal is received from the user through an external device, the control unit 380 may detect an external device which may be able to transmit the call signal. Here, if an external device capable of transmitting the call signal is not detected, the control unit 380 may output a pop-up window 920 for selecting whether to transmit notification information for requesting transmission of a call signal from an external device.

When transmission of the notification information is selected, the control unit 380 may transmit the notification information through the first communication unit 310, and display transmission particulars 930 on the display unit 351.

The notification information may be immediately displayed on the external device, or when it is sensed that the external device interworks with the watch type terminal 300, the notification information may be output to the external device. Accordingly, in an exemplary embodiment of the present disclosure, the user may recognize that a call signal should be transmitted without a separate control command in a case in which an external device interworks with the watch type terminal later.

Meanwhile, when log information indicating a call signal is selected, the control unit 380 may output a pop-up window 940 for immediately selecting a call signal transmission subject. For example, as illustrated in first and second drawings of FIG. 9C, when a call signal transmission request is received, the control unit 380 may output a pop-up window 940 allowing the user to select an external device as a call signal transmission subject.

Figure 9D:
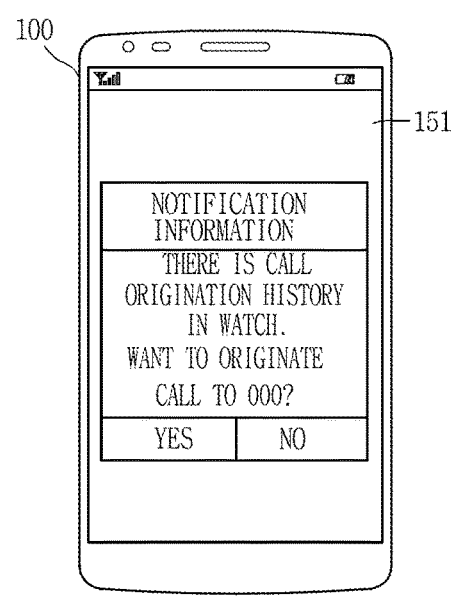

Here, when the external device receives the call signal transmission request, the external device may output a pop-up window on a display unit thereof such that the user may select whether to transmit the call signal. For example, as illustrated in FIG. 9D, in a case in which the external device is the mobile terminal 100, a pop-up window asking whether to transmit a call signal may be output on the display unit 151 of the mobile terminal 100, and here, the user may select whether to transmit the call signal on the basis of the call signal transmission request received from the watch type terminal.

In addition, the control unit 380 may determine a transmission subject or a call signal according to different touches with respect to log information indicating a call signal. For example, when a short touch is applied to the log information, the control unit 380 may transmit a call signal through the watch type terminal 300, and when a long touch is applied to the log information, the control unit 380 may transmit a call signal through an external device.

In the above, transmission of a call signal has been described, but the present disclosure may also be applied in the same manner when various functions using a message and network communication are performed.

Accordingly, in an exemplary embodiment of the present disclosure, various controlling may be performed by using the watch type terminal and an external device interworking with the watch type terminal.

In an exemplary embodiment of the present disclosure, battery consumption of the watch type terminal may be reduced by performing communication through a communication unit of an external device capable of interworking with the watch type terminal.

Also, a usage time of the watch type terminal may increase by reducing battery consumption of the watch type terminal.

Also, the user may be allowed to recognize a battery consumption amount through communication of the watch type terminal in advance, whereby the user may effectively use the battery.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the control unit 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A watch type terminal comprising:
   a first communication unit configured to communicate with an external server;

41 a second communication unit configured to communicate with an external device;
a display unit configured to display a plurality of information items; and
a control unit configured to:
control second communication with the external server through a communication unit in the external device and through the second communication unit when the terminal is not connected to the external server through the first communication unit;
control first communication with the external server through the first communication unit when the terminal is not connected to the external device through the second communication unit;
wherein the control unit is further configured to:
estimate amount of consumption data corresponding to an execution of each function related to each of the plurality of information items;
set touch duration of touch input for executing a function related to each of the plurality of information items respectively, based on the estimated amount of consumption data;
receive a touch input applied to one information item of the plurality of information items;
determine whether or not a duration of the touch input reaches the set touch duration for executing a function related to the one information item;
execute the function related to the one information item when the duration of the touch input reaches the set touch duration,
wherein the control unit is further configured to control the display unit to display the plurality of information items such that each of the plurality of information items is visually distinguished on the basis of the estimated amount of consumption data corresponding to the execution of the function related to each of the plurality of information items, respectively.

2. The watch type terminal of claim 1, wherein the control unit is further configured to begin controlling communications with the external server through the communication unit in the external device when the external device satisfies a preset condition has been met.

3. The watch type terminal of claim 2, wherein the control unit is further configured to:
transmit identification information of the watch type terminal to the external device prior to communicating with the external server through the communication unit in the external device, and
receive information from the external device through the second communication unit.

4. The watch type terminal of claim 2, wherein the preset condition relates to usage information for the external device, and wherein the control unit is further configured to determine whether to activate the second communication unit based on the usage information.

5. The watch type terminal of claim 4, wherein the control unit is further configured to deactivate the second communication unit based on the usage information and activate the second communication unit based on a user request.

6. The watch type terminal of claim 2, wherein the preset condition relates to a user request, and wherein the control unit is further configured to activate the second communication unit based on the user request.

7. The watch type terminal of claim 1, wherein the control unit is further configured to execute a function related to the one information item in response to the touch input of a first duration when the estimated amount of consumption data is

42 less than or equal to a first amount of data, and configured to execute a function related to the one information item in response to the touch input of a second duration, longer than the first duration, when the estimated amount of consumption data is greater than the first amount of data.

8. The watch type terminal of claim 1, wherein when the first communication unit is deactivated and the control unit determines that the watch type terminal is not interworking with the external device, the control unit is further configured to active the first communication unit.

9. The watch type terminal of claim 1 further comprising:
the display unit configured to display log information indicating one or more calls,
wherein the watch type terminal and the external device are capable of sending and receiving phone calls, and
wherein the control unit is further configured to control the display unit to display the log information such that a call associated with the external device is visually distinguished from a call associated with the watch type terminal.

10. The watch type terminal of claim 9, wherein the control unit is further configured to determine whether the watch type terminal or the external device will execute a function related to selected call information when a touch input is applied to a portion of the display unit where the selected call information is being displayed.

11. The watch type terminal of claim 10, wherein the control unit is further configured to control the external device to output notification information indicating whether the function related to the selected call information is to be performed by the external device.

12. The watch type terminal of claim 1, wherein when the watch type terminal interworks with the external device, the control unit is further configured to receive identification information from the external device through the second communication unit, and to control the first communication unit such that the external device communicates using the first communication unit and not the communication unit in the external device.

13. The watch type terminal of claim 1, wherein when the watch type terminal interworks with the external device, the control unit is further configured to control the display unit to output a message prompting a user to select whether to perform communication through the external device.

14. A method of controlling a watch type terminal, the method comprising:
displaying a plurality of information items;
estimating amount of consumption data corresponding to an execution of each function related to each of the plurality of information items;
setting touch duration of touch input for executing a function related to each of the plurality of information items respectively, based on the estimated amount of consumption data;
receiving a touch input applied to one information item of the plurality of information items;
determining whether or not a duration of the touch input reaches the set touch duration for executing a function related to the one information item; and
executing the function related to the one information item when the duration of the touch input reaches the set touch duration,
wherein the method is further comprising:
displaying the plurality of information items such that each of the plurality of information items is visually distinguished on the basis of the estimated amount of consumption data corresponding to the execution of the function related to each of the plurality of information items, respectively.

* * * * *